US011062054B2

United States Patent
Brown et al.

(10) Patent No.: US 11,062,054 B2
(45) Date of Patent: Jul. 13, 2021

(54) METHODS AND SYSTEM FOR PROVIDING OVERSIGHT AND AUDITING OF ADVERTISEMENT IMPRESSIONS AND FOR RUNNING ADVERTISEMENT CAMPAIGNS

(71) Applicant: MadHive, Inc., New York, NY (US)

(72) Inventors: Aaron Brown, New York, NY (US); Tom Bollich, New York, NY (US); Adam Helfgott, New York, NY (US); Rebecca Lerner, Los Angeles, CA (US); Nelson Hunter Prendergast, Reynoldsburg, OH (US); Nikolaos Melissaris Papanikolaou, Westfield, NJ (US)

( * ) Notice: Subject to any disclaimer, the term of this patent is extended or adjusted under 35 U.S.C. 154(b) by 0 days.

(21) Appl. No.: 16/562,796

(22) Filed: Sep. 6, 2019

(65) Prior Publication Data

US 2020/0082433 A1 Mar. 12, 2020

Related U.S. Application Data

(60) Provisional application No. 62/727,610, filed on Sep. 6, 2018.

(51) Int. Cl.
*G06Q 30/00* (2012.01)
*G06F 21/62* (2013.01)
(Continued)

(52) U.S. Cl.
CPC .......... *G06F 21/6263* (2013.01); *G06F 16/27* (2019.01); *G06F 17/18* (2013.01);
(Continued)

(58) Field of Classification Search
CPC ...... G06F 21/6263; G06F 17/18; G06F 16/27; G06Q 30/0246; G06Q 30/0251;
(Continued)

(56) References Cited

U.S. PATENT DOCUMENTS

| | | | |
|---|---|---|---|
| 2019/0370842 A1* | 12/2019 | Boyapally | G06Q 30/0217 |
| 2019/0370866 A1* | 12/2019 | Lawbaugh | H04L 9/0637 |
| 2019/0378162 A1* | 12/2019 | Goldberg | G06Q 30/0242 |

OTHER PUBLICATIONS

Content Taxonomy v2.0, Tier 1-Tier 2 Categories, 2017 IAB Technology Laboratory.
(Continued)

*Primary Examiner* — Yehdega Retta
(74) *Attorney, Agent, or Firm* — The Plus IP Firm; Derek Fahey

(57) ABSTRACT

A system and methods are disclosed that enable advertisers, publishers, and consumers to interact to provide well-targeted advertisement impressions, while preserving consumer privacy. Particularly, the system and methods enable accurate and reliable targeting of advertisements without the need for privacy-invasive tracking and collection of consumer information by advertisers or publishers. Instead, the consumer retains complete control of his or her own private information, even while that private information is used for programmatic targeting of advertisements. The system and methods disclosed herein advantageously utilize blockchain as a tool for arbitrating data, which accounts for and helps to eliminate fraud, costly arbitrage, and brand safety concerns by providing the programmatic advertising ecosystem with trust, permanence, transparency, and auditability.

20 Claims, 8 Drawing Sheets

(51) Int. Cl.

| | |
|---|---|
| *G06Q 30/02* | (2012.01) |
| *G06F 17/18* | (2006.01) |
| *H04L 9/06* | (2006.01) |
| *H04L 9/00* | (2006.01) |
| *H04L 9/08* | (2006.01) |
| *H04N 21/234* | (2011.01) |
| *H04N 21/2347* | (2011.01) |
| *H04N 21/458* | (2011.01) |
| *H04N 21/81* | (2011.01) |
| *G06F 16/27* | (2019.01) |

(52) U.S. Cl.
CPC ..... *G06Q 30/0246* (2013.01); *G06Q 30/0251* (2013.01); *H04L 9/006* (2013.01); *H04L 9/008* (2013.01); *H04L 9/0637* (2013.01); *H04L 9/0643* (2013.01); *H04L 9/0822* (2013.01); *H04N 21/23424* (2013.01); *H04N 21/23473* (2013.01); *H04N 21/458* (2013.01); *H04N 21/812* (2013.01); *H04L 2209/38* (2013.01); *H04L 2209/463* (2013.01)

(58) Field of Classification Search
CPC ..... H04L 9/0822; H04L 9/0637; H04L 9/006; H04L 9/008; H04L 9/0643; H04L 2209/463; H04L 2209/38; H04N 21/23424; H04N 21/23473; H04N 21/458; H04N 21/812
See application file for complete search history.

(56) References Cited

OTHER PUBLICATIONS

Boldyreva, A., Threshold Signatures, Multi-signatures and Blind Signatures Based on the Gap-Diffie-Hellman-Group Signature Scheme, LNCS 2567, 2003, pp. 31-46, Springer-Verlag Berlin Heidelberg.

Boneh, D. et al., Short signatures from the Weil pairing, Computer Science Department, Stanford University, Asiacrypt 2001, pp. 516-534, Lecture Notes in Computer Science, vol. 2248. Springer, Berlin, Heidelberg.

Boneh, D. et al., Aggregate and Verifiably Encrypted Signatures from Bilinear Maps. In: Biham E. (eds) Advances in Cryptology, Eurocrypt 2003. Lecture Notes in Computer Science, vol. 2656, Springer, Berlin, Heidelberg.

\* cited by examiner

METHODS AND SYSTEM FOR PROVIDING OVERSIGHT AND AUDITING OF ADVERTISEMENT IMPRESSIONS AND FOR RUNNING ADVERTISEMENT CAMPAIGNS

This application claims the benefit of priority of U.S. provisional application Ser. No. 62/727,610, filed on Sep. 6, 2018 the disclosure of which is herein incorporated by reference in its entirety.

FIELD

The method and systems disclosed in this document relates to advertising technology and, more particularly, to methods and systems for a serving targeting advertisement to a consumer device

BACKGROUND

Unless otherwise indicated herein, the materials described in this section are not prior art to the claims in this application and are not admitted to the prior art by inclusion in this section.

Today's programmatic advertising ecosystem has become increasingly broken. Modern programmatic advertising techniques have become privacy-invasive and at odds with the consumer, which is clearly evidenced by the proliferation and wide spread adoption of ad blockers by consumers. Additionally, advertising fraud costs the advertising industry billions of dollars every year. As a result, advertisers must spend more and more to reach consumers and publishers make less and less. Even as costs rise, advertisers are unable to effectively evaluate how their budgets are spent or track the customer's journey. What is needed is a programmatic advertising system that provides transparency and trust with the consumer by respecting their privacy, while also providing advertisers and publishers with robust and effective programmatic advertising.

SUMMARY

A method for auditing an advertisement impression in which a first advertisement was presented in conjunction with first media content is disclosed. The method comprises receiving, with a transceiver of a first computing device, a first message from a second computing device indicating that a first advertisement was presented in conjunction with first media content, the first message including (i) an identifier of the first advertisement and (ii) an first aggregated signature, the first aggregated signature being an aggregation of a set of proofs of interest, each proof of interest in the set of proofs of interest being signed under a respective content mapping key, associations between each of the respective content mapping keys and at least one media content classifier being stored on at least one blockchain. The method comprises retrieving, with the transceiver, from the at least one blockchain, (i) the at least one media content classifier associated with each of the respective content mapping keys under which the set of proofs of interest were signed and (ii) a first targeting model for the first advertisement, the first targeting model being stored on at least one blockchain in association with the identifier of the first advertisement and defining a target audience for the first advertisement. The method comprises evaluating, with a processor of the first computing device, the first targeting model for the first advertisement based on the at least one media content classifier associated with each of the respective content mapping keys under which the set of proofs of interest were signed, to determine whether a user to which the first advertisement was presented fits within the target audience for the first advertisement. The method comprises transmitting, with the transceiver, only if the user to which the first advertisement was presented fits within the target audience for the first advertisement, a second message indicating that the presentation of the first advertisement in conjunction with the first media content formed a valid advertisement impression, the second message being transmitted to one of (i) a third computing device associated with a provider of the first media content and (ii) the second computing device, the second message including a signature under a public key of the first computing device.

A method for running an advertising campaign is disclosed. The method comprises generating, with a processor of a computing device, a targeting model that defines a target audience for an advertisement of the advertising campaign. The method comprises transmitting, with a transceiver of the computing device, a first message to at least one smart contract that is stored on at least one blockchain, the first message including the targeting model and instructions for retrieving the advertisement, receipt of the first message by the at least one smart contract causing publication of the targeting model and the instructions for retrieving the advertisement on the at least one blockchain. The method comprises receiving, with the transceiver, a second message from a second computing device associated with a provider of media content, the second message indicating that the advertisement was presented in conjunction with the media content to form a valid advertisement impression, the second message including a signature under a public key of a third computing device.

BRIEF DESCRIPTION OF THE DRAWINGS

The foregoing aspects and other features of the methods and system are explained in the following description, taken in connection with the accompanying drawings.

DETAILED DESCRIPTION

Figure 1:
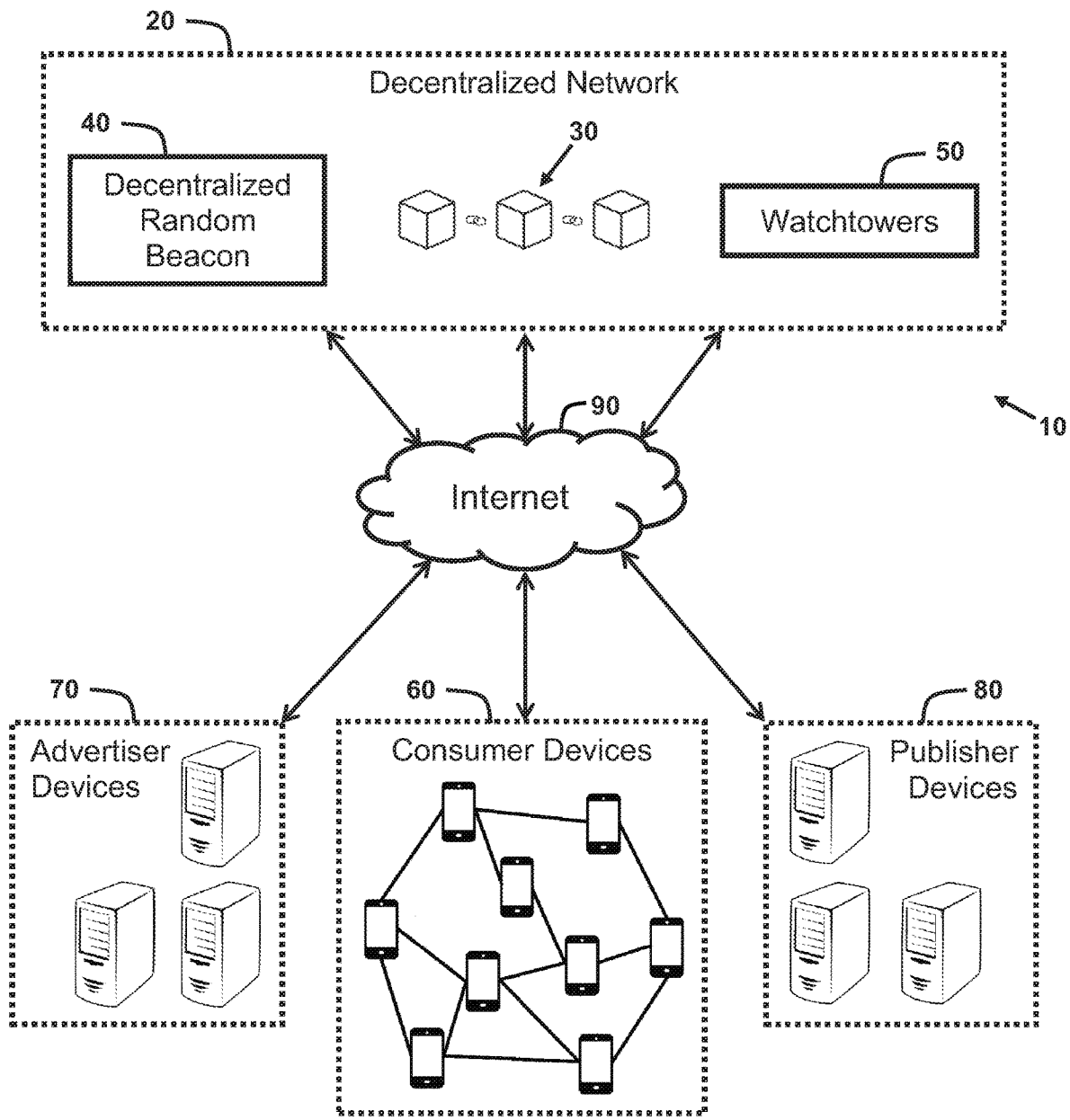
FIG. 1 shows an exemplary embodiment of a system for serving targeted advertisements.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

The programmatic advertising techniques disclosed herein advantageously provide trust and transparency with the consumer by respecting their privacy interests, while also providing advertisers and publishers with more robust and effective programmatic advertising. As discussed in greater detail herein, the techniques disclosed herein enable accurate and reliable targeting of advertisements without the need for privacy-invasive tracking and collection of consumer information by advertisers or publishers. Instead, the consumer retains complete control of his or her own private information, even while that private information is used for programmatic targeting of advertisements.

The programmatic advertising techniques disclosed herein advantageously utilize blockchain as a tool for arbitrating data, which accounts for and helps to eliminate fraud, costly arbitrage, and brand safety concerns by providing the programmatic advertising ecosystem with trust, permanence, transparency, and auditability. Additionally, by incorporating elements of blockchain, the programmatic advertising techniques disclosed herein realign the incentives in the programmatic advertising ecosystem to promote good behavior by all parties.

System Overview

Figure 2:
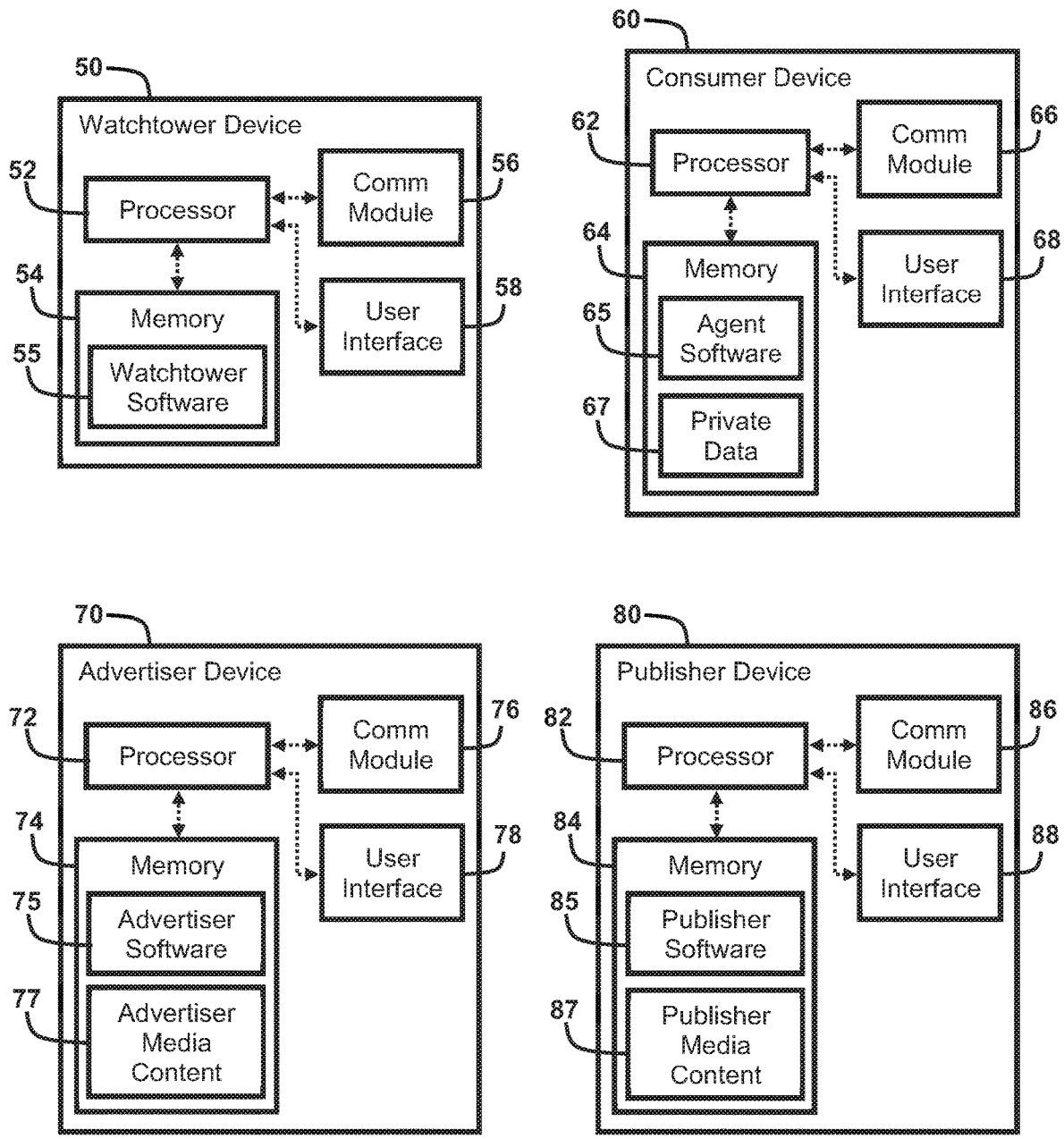
FIG. 2 shows exemplary hardware embodiments of a watchtower, a consumer device, an advertiser device, and a publisher device of the system of FIG. 1.

With reference to FIGS. 1-2, exemplary embodiments of a system 10 for serving well targeted advertisements to consumers in a privacy preserving manner using blockchain technology are described. With reference to FIG. 1, the system 10 comprises a plurality of computing devices that are associated with different parties or components of the system 10. Particularly, in the illustrated embodiment, the system 10 includes a distributed network 20 having at least one public blockchain 30, a decentralized random beacon 40, and a plurality of watchtowers 50. In addition, the system 10 comprises a plurality of consumer devices 60, at least one advertiser device 70, and at least one publisher device 80 which communicate and interact with the distributed network 20 via network infrastructure, such as the Internet 90.

As will be described in greater detail below, the system 10 enables the purchase and sale of targeted advertisement impressions with respect to consumers associated with the consumer device 60. As used herein, an "advertisement impression" refers to the presentation of an advertisement to a user, in particular to a consumer associated with a consumer device 60. Particularly, an advertiser provides an advertisement with an associated targeting model that defines the target audience for the particular advertisement. Likewise, a publisher provides compelling media content that a consumer interested in consuming. In exchange for being allowed to consume the publisher's media content, the consumer may be required view or hear an advertisement alongside the publisher's media content or prior to consuming the publisher's media content. Generally, in order for an advertiser to be willing to pay the publisher for presenting an advertisement to the consumer in conjunction with the publisher's media content, the advertisement impression must satisfy one or more constraints defined by the advertiser. Conversely, in order in order for a publisher to be is willing to provide its compelling media content in conjunction with the advertisement, the advertisement impression must satisfy one or more constraints defined by the publisher.

The system 10 enables the provision of advertisement impressions with respect to consumers that satisfy the targeting model associated with the advertisement, while also complying with any additional constraints set by the advertiser or the publisher. Moreover, the system 10 enables the targeting model to be applied to private consumer data, held by the consumer devices 60, in a manner than advantageously maintains the privacy of the consumer data. In this way, the system 10 enables the provision of well-targeted advertisement impressions in a non-privacy invasive manner.

The advertiser devices 70 are devices owned or in the possession of an advertiser entity, such as an individual or an organization, which wishes to purchase targeted advertisement impressions of an advertisement by consumers associated with the plurality of consumer devices 60 who fit within a target audience. Particularly, an advertiser may provide one or more advertisements in the form of audio and/or visual media content. The advertisements can be retrieved by consumer devices 60 and/or publisher devices 80 and viewed in conjunction with and/or prior to the media content provided by publishers. The advertiser may also specify specific advertisement targeting criteria, particularly in the form of a targeting model, which define the target audience for a particular advertisement. The advertiser may also set various other rules and constraints that outline how, when, and/or to whom the advertisement may be served by a publisher in order to receive credit and/or payment for an advertisement impression.

The publisher devices 80 are devices owned or in the possession of a publisher entity, such as an individual or an organization, that wishes to sell targeted advertisement impressions of advertisements by consumers associated with the plurality of consumer devices 60. Particularly, a publisher provides compelling media content that attracts consumers, thereby providing an opportunity to sell an advertisement impression. The compelling media content provided by the publisher may comprise any media content such as audio content, video content, text content, image content, multi-media content, interactive content (e.g., video games), and the like. A publisher may require that the compelling media content be provided and/or consumed in conjunction with an advertisement, such that the compelling media content is viewed or heard simultaneously with an advertisement or can only be viewed or heard after viewing or hearing an advertisement. If service of the advertisement to the consumer is performed in satisfaction of the advertisement targeting criteria or other rules and constraints defined by the advertiser, then the publisher can receive credit and/or payment for the advertisement impression.

The consumer devices 60 are devices owned or in the possession of a consumer entity, such as an individual or an organization, that wishes to consume (e.g., view, listen, or otherwise interact with) the compelling media content provided by a publisher and is will to view an advertisement alongside of or prior to consuming the publisher's media content. Particularly, using the consumer devices 60, consumers access, view, or otherwise interact with compelling media content provided by the publishers. If service of a particular advertisement to the particular consumer would satisfy the advertisement targeting criteria or other rules defined by the advertiser, the publisher may provide compelling media content in conjunction an advertisement, such that the compelling media content is viewed or heard simultaneously with an advertisement or can only be viewed or heard after viewing or hearing an advertisement.

Each consumer device 60 holds private consumer data that may, for example, comprise private information of an individual who owns the respective consumer device 60. In one particular example, the private information may comprise demographic information, historical online behavior information, and other information of the type typically used to target online advertisements. Each consumer device 60 includes agent software that runs with privileged access in the background of the consumer device 60 and functions as an intelligent, cryptographically-secured repository of the private consumer data. The agent software manages the private consumer data in the secure repository and, when actions need to be performed on that data, agent software performs the actions inside the secure repository and produces an answer or other output. Most notably, advertisement targeting criteria, in particular a targeting model that defines the target audience for a particular advertisement, can be tested against the private consumer data to determine whether the advertisement targeting criteria are satisfied. The agent software advantageously tests the targeting model in a manner such that the privacy of the private consumer data remains intact.

The system 10 advantageously utilizes the distributed network 20 and blockchain technology to enable the provision of well-targeted advertisement impressions of advertisements by consumers associated with the consumer device 60 in a non-privacy invasive manner. The distributed network 20 is a decentralized peer-to-peer network of computing devices, referred to herein as nodes, which are configured to communicate with one another via a network infrastructure, such as the Internet 90. The nodes may comprise any network-connected computing device and generally comprise at least a processor, a memory, and a network communication module. The nodes operate to fulfill various roles required to maintain and operate at least one public blockchain 30, such as storing a copy of some or all of the at least one public blockchain 30, processing transactions, generating blocks to record the transactions, adding the blocks to at least one public blockchain 30, approving or verifying blocks to be added to at least one public blockchain 30, and broadcasting new blocks to the nodes of the distributed network 20.

It will be appreciated by those of ordinary skill in the art that a blockchain is a distributed ledger. Blockchains have the advantageous property that, once data has been added to a blockchain, the data is immutable and cannot be modified. A blockchain is comprised of an ordered sequence of "blocks." Each block contains some data, a hash of the block, and a hash of the previous block. The data stored in the block is application dependent and may include, for example, information regarding one or more transactions on the blockchain, program instructions for a smart contract, and information regarding a state of the blockchain or the distributed network that maintains the blockchain. The hash of the block acts as a digital fingerprint and uniquely identifies the block and its content. The hash of the previous block acts as a link or chain to the previous block in the ordered sequence. These hashes enable the immutable quality of the blockchain. Particularly, if the data of particular block is tampered with, the hash of the block changes, with the result that any subsequent blocks become invalid. In addition to hashing, a blockchain utilizes a decentralized consensus mechanism, such as a proof of work or proof of stake protocol, which provides a process and set of rules for determining, in a distributed and decentralized manner, whether or not a new block should be added to the blockchain. The consensus mechanism further makes tampering with the data of the blockchain highly impractical, if not impossible.

The at least one public blockchain 30 is configured to support smart contracts and may, for example, be an Ethereum-based blockchain. As used herein "smart contracts" are executable computer programs stored on the blockchain and are executed autonomously by nodes of a distributed network in a decentralized manner. Smart contracts are written using a suitable programming language, such as Solidity. As a corollary, the blockchain 30 is also configured to support at least two types of accounts, externally owned accounts and contract accounts. It will be appreciated, however, that in some embodiments there needn't be a technical distinction between the two types of accounts. Externally owned accounts are associated with individual users or organizations (e.g., the consumers, advertiser, and/or publishers) and are controlled with a corresponding private key in the possession of the associated user or organization. Each externally owned accounts can generally send or receive digital currency (e.g., Ether) and generally has a digital currency balance. Additionally, externally owned accounts can send or initiate transactions. A transaction may comprise the transferring digital currency to another account, initiating execution of a smart contract, or a combination thereof.

In contrast, contract accounts operate autonomously and are controlled by code and, in particular, a smart contract. Much like an externally owned account, a contract account can generally send or receive digital currency and may have a digital currency balance. However, a contract account executes instructions of a smart contract in response to receiving a triggering transaction or message from an externally owned account or another contract account. A smart contract may, for example, distribute received digital currency to other accounts based on a set of rules. In practice, the instructions of a smart contract are executed by a virtual machine comprised of the distributed and decentralized nodes of the distributed network 20. Since smart contracts are stored in the at least one public blockchain 30, they inherit the advantages of the blockchain and, in particular, are distributed and cannot be modified. In this way, no individual party is in control of the digital currency in a contract account, no one can tamper with the instructions of the smart contract, and the outputs of the smart contract are validated by the nodes of the distributed network 20.

The distributed network 20 is configured to provide a decentralized random beacon 40 (which may also be referred to as a decentralized random clock). The decentralized random beacon 40 is a cryptographically secure source for an unbiasable, publicly verifiable random function (VRF) that broadcasts a verifiable random value $\xi$ at regular intervals. Each verifiable random value $\xi$ broadcasted by the decentralized random beacon 40 is unpredictable given knowledge of all prior random values, but is also easily verifiably correct. The verifiable random values $\xi$ are generated jointly in a decentralized manner by a group of nodes $G_{RB}$ of the distributed network 20. Particularly, the group of nodes $G_{RB}$ that participate in providing the decentralized random beacon 40 utilize a decentralized random beacon protocol which enables the group of nodes $G_{RB}$ to agree upon and jointly produce a deterministic, pseudo-random sequence of verifiable random values $\xi$. Additionally, the decentralized random beacon protocol is Byzantine Fault Tolerant with respect to the group of nodes $G_{RB}$ that coordinate to generate each verifiable random value $\xi$.

In some embodiments, the decentralized random beacon 40 is generated using a scheme in which the group of nodes $G_{RB}$ is rewarded for generating the verifiable random values $\xi$. The nodes must place a stake, which may be held in the form of a digital currency or token and which may be revoked for non-participation or malicious participation. The reward for generating the verifiable random values $\xi$ is greater than the rate of inflation of the currency for the required stake held in escrow or, in other words, the reward exceeds the time value of the stake.

In some embodiments, the decentralized random beacon protocol utilized by the decentralized random beacon 40 employs a t-of-n threshold BLS signature scheme to for randomness generation, where n is the number of nodes in the group of nodes $G_{RB}$ that participate in providing the decentralized random beacon 40. In a set up phase, a Shamir's Secret Sharing Scheme is used for distributed key generation. Particularly, the group of nodes $G_{RB}$ generate a group public key and secret key shares for each node in the group of nodes $G_{RB}$. It should be appreciated that the group secret key is not explicitly known to any individual node in the group of nodes $G_{RB}$, but can be implicitly used with any threshold number t of signature shares that are generated using the respective secret key shares. The threshold number t is a Byzantine Fault Tolerant subset t=[2n/3]+1 of the signature shares.

To generate each verifiable random value $\xi$, the group of nodes $G_{RB}$ each generate and broadcast a signature share based on the previous verifiable random value $\xi$ using their respective secret key share with a pairing friendly elliptic curve. In the case of generating a first verifiable random value $\xi$, the group of nodes $G_{RB}$ generate their signature shares with a random seed value, which may comprise a nothing-up-my-sleeve-value such as the hash of a random word. It will be appreciated that these signature shares do not leak the associated secret key share of the participating nodes. When any node in the group of nodes $G_{RB}$ receives a threshold number t of signature shares, a group signature can be recovered, and a new verifiable random value $\xi$ is calculated as the hash of the group signature.

The distributed network 20 includes a subset of nodes that are referred to herein as the watchtowers 50. Each watchtower 50 is associated with a producer of one or more particular variants of the agent software that runs on the consumer devices 60. As discussed in greater detail below, the watchtowers 50 are responsible for maintaining or operating one or more blockchains on the distributed network 20 that are used to enable the service of well-targeted advertisements to consumer devices 60 in a manner than advantageously maintains the privacy of the consumer data that is used to target the advertisements. Additionally, each watchtower 50 has a duty of care to the network and plays a supervisory or oversight role with respect to consumer devices 60 that operate with a particular variant of agent software that is produced by the entity that operates a respective watchtower 50.

FIG. 2 shows exemplary hardware embodiments of a watchtower 50, a consumer device 60, an advertiser device 70, and a publisher device 80. Particularly, the watchtower 50, the consumer devices 60, the advertiser devices 70, and the publisher device 80 generally take the form of computing devices, each having at least a processor 52, 62, 72, or 82, a memory 54, 64, 74, or 84, and a communication module 56, 66, 76, or 86, respectively. The memories 54, 64, 74, and 84 are configured to store data and program instructions that, when executed by the respective processor 52, 62, 72, or 82, enable the respective computing device to perform various operations described herein. The memories 54, 64, 74, and 84 may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processors 52, 62, 72, and 82 may include a central processing unit, graphics processing units, multiple processing units, dedicated circuitry for achieving functionality, programmable logic, or other processing systems.

The communication modules 56, 66, 76, and 86 generally comprise one or more transceivers, modems, or other communication devices configured to enable communications with various other devices via a network infrastructure, in particular via the Internet 90, using a suitable communication standard. The communication modules 56, 66, 76, and 86 may further comprise hardware such as antennas, processors, memories, oscillators, or other hardware conventionally included with transceivers, modems, or other communication devices.

The consumer devices 60, although illustrated as smart phones in FIG. 1, may comprise wide variety of different network-enabled computing devices that store private consumer data. Exemplary consumer devices 60 may include smart phones, laptop computers, tablet computers, desktop computers, smart televisions, home audio receivers, and in-car infotainment systems or audio receivers. The watchtowers 50, the advertiser devices 70, and the publisher devices 80 may likewise comprise a wide variety of different network-enabled computing devices, but generally comprise servers or the like. In some embodiments, the watchtowers 50, the consumer devices 60, the advertiser devices 70, and/or the publisher devices 80 further include one or more user interfaces 58, 68, 78, and 88. The user interfaces 58, 68, 78, and 88 may comprise a display screen, including touch-sensitive displays, a mouse or other pointing device, a keyboard or other keypad, speakers, a microphone, and other user interfaces that will be recognized by those of ordinary skill in the art. The user interfaces 68 the consumer devices 60, in particular, at least include output devices necessary to view or hear an audio and/or visual advertisement provided in conjunction with the compelling media context from publishers.

The memory 54 of the watchtowers 50 stores watchtower software 55 that at least enables the watchtower 50 to maintain and operate the at least one public blockchain 30 of the distributed network 20. In particular, the watchtower software 55 may enable the watchtower 50 to prepare and submit a block of transactions to the at least one public blockchain 30, verify or validate blocks submitted to the at least one public blockchain 30 by other watchtowers, execute smart contracts of the at least one public blockchain 30, and perform other known functions for maintaining and operating the at least one public blockchain 30. Additionally, the watchtower software 55 enables the watchtower 50 to perform various other operations described herein and, in particular, operations relating to supervision of a particular subset of consumer devices 60 that the respective watchtower 50 is responsible for (e.g., those consumer devices using a variant of the agent software produced by the entity that operates the watchtower). It should be appreciated that there may be a number of different variants of the watchtower software 55. However, each variant of the watchtower software 55 may be developed using a common SDK implementing a common API for maintaining and operating the at least one public blockchain 30 of the distributed network 20, as well as the other devices of the system 10.

The memories 64 of the consumer devices 60 store agent software 65 that, as described above, runs with privileged access in the background of the consumer device 60 and functions as an intelligent, cryptographically-secured repository of the private consumer data. Additionally, the memory 64 of the consumer devices 60 further stores private consumer data 67. As described above, the private consumer data 67 may, for example, comprise private information of an individual who owns the respective consumer device 60. The agent software 65 enables the consumer devices 60 to interact with the watchtowers 50, the advertiser devices 70, the publisher devices 80, as well as the at least one public blockchain 30, and smart contracts thereof, to facilitate the targeting of advertisements based on targeting models which can be tested against the private consumer data 67. It should be appreciated that there may be a number of different variants of the agent software 65 developed by different producers associated with different watchtowers 50. However, each variant of the agent software 65 may be developed using a common software development kit (SDK) implementing a common application programming interface (API) for interacting with the at least one public blockchain 30 of the distributed network 20, as well as the other devices of the system 10.

The memories 74 of the advertiser devices 70 store advertiser software 75 that at least enables the advertiser devices 70 to interact with the at least one public blockchain 30 to submit an advertisement with an associated targeting model and to purchase targeted advertisement impressions of consumers associated with the plurality of consumer devices 60. It should be appreciated that there may be a number of different variants of the advertiser software 75. However, each variant of the advertiser software 75 may be developed using a common SDK implementing a common API for interacting with the at least one public blockchain 30 of the distributed network 20, as well as the other devices of the system 10. Additionally, the memory 74 of the advertiser devices 70 may further store advertiser media content 77. The advertiser media content 77 may comprise one or more advertisements in the form of audio and/or visual media content. In some embodiments, the advertisements can be retrieved by consumer devices 60 and/or publisher devices 80 from the memory 74 of the advertiser device 70. However, in many embodiments, the advertisements may be additionally stored at some other location, such as an ad server, for the purpose retrieval by consumer devices 60 and/or publisher devices 80.

The memory 84 of the publisher devices 80 stores publisher software 85 that at least enables the publisher devices 80 to interact with the watchtowers 50, the consumer devices 60, the advertiser devices 70, as well as the at least one public blockchain 30, and smart contracts thereof, to provide compelling media content to consumer devices 60 in conjunction with a well-targeted advertisement such that the publisher can be credited for the advertisement impression. It should be appreciated that there may be a number of different variants of the publisher software 85. However, each variant of the publisher software 85 may be developed using a common SDK implementing a common API for interacting with the at least one public blockchain 30 of the distributed network 20, as well as the other devices of the system 10.

Methods for Serving Targeted Advertisements to Consumer Devices

Methods and software for operating the system 10 are described below. Particularly, various methods, processes, and/or operations are described for implementing and interacting with at least one blockchain on a distributed network for the purpose of collecting statistics with respect to an aggregation of distributed private data. In the description of the methods, processes, and/or operations, statements that a particular device, method, and/or processer is performing some task or function generally refers to a processor (e.g., the processor 52, 62, 72, or 82) of a computing device in the system 10 executing corresponding programmed instructions (e.g., the watchtower software 55, the agent software 65, the advertiser software 75, or the publisher software 85) stored in non-transitory computer readable storage media (e.g., the memory 54, 64, 74, or 84) operatively connected to the processor to manipulate data or to operate one or more components of the computing device or of the system 10 to perform the task or function. Additionally, and in particular, statements that a smart contract of a blockchain performs some task or function generally refers to a processor of a node of a distributed network (e.g., the processor 52 of a watchtower 50 or other node of the distributed network 20) executing corresponding programmed instructions of the smart contract, which are stored on the blockchain, to manipulate data of the blockchain to perform the task or function. Moreover, the steps or operations of the methods and/or processes may be performed in any feasible chronological order, regardless of the order shown in the figures or the order in which the steps or operations are described.

The Advertising Blockchain and Cryptographic Identity Registration

Figure 3:
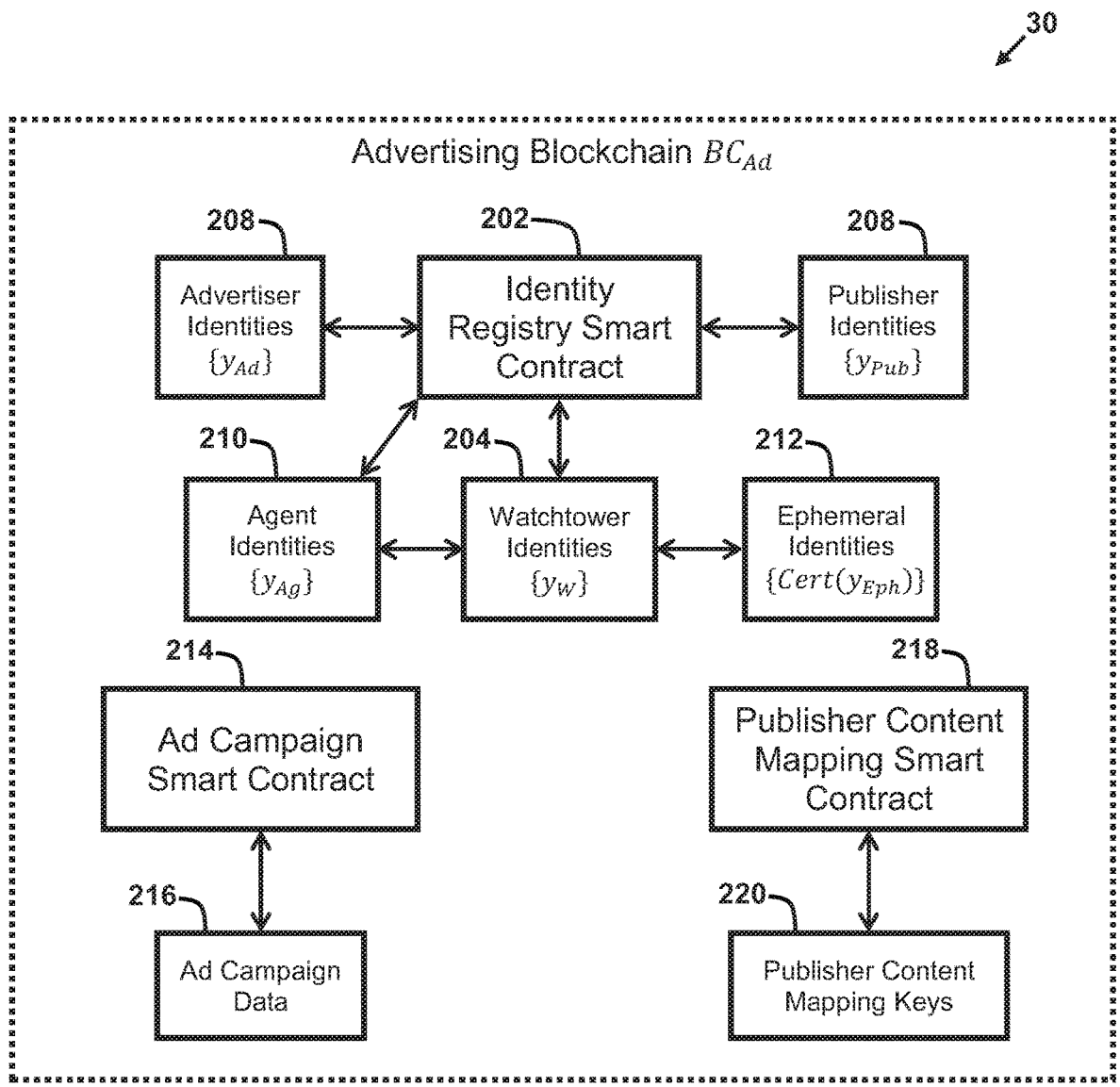
FIG. 3 shows exemplary blockchains storing exemplary smart contracts and data used for serving targeted advertisements in the system of FIG. 1.

With reference to FIG. 3, the at least one public blockchain 30 includes an advertising blockchain $BC_{Ad}$, which is configured to support smart contracts and is maintained and operated by the watchtowers 50. As noted above, each watchtower 50 is associated with a producer of one or more particular variants of the agent software 65 that runs on the consumer devices 60. The executable program instructions of each smart contract are stored on the advertising blockchain $BC_{Ad}$ and are executed in a distributed manner by the watchtowers 50 when the smart contracts are transacted with by an authorized device of the system 10. The smart contracts of the advertising blockchain $BC_{Ad}$ advantageously have access to the pseudo-random sequence verifiable random values. Additionally, the advertising blockchain $BC_{Ad}$ is configured to allow interactions with the blockchain on a service transaction model. In this context, a service transaction is a transaction that allows the distributed network 20, in particular the watchtowers 50, to cover the cost of performing computation and/or modification of state in the advertising blockchain $BC_{Ad}$.

In some embodiments, the advertising blockchain $BC_{Ad}$ is a permissioned blockchain that utilizes a consensus mechanism other than a proof of work based consensus mechanism. Particularly, in at least one embodiment, the consensus mechanism of the advertising blockchain $BC_{Ad}$ operates with a leader election process with respect to an allowed set of validators, i.e., some or all of the watchtowers 50. The leader election process utilizes the pseudo-random sequence verifiable random values provided by the decentralized random beacon 40 to randomly determine which of the watchtowers 50 are responsible for the preparation and submission of each block of transactions to the advertising blockchain $BC_{Ad}$.

The leader election process can be implemented using a variety of different methods. For example, in one embodiment, let the values $s=\{s_1, s_2, \ldots, s_n\}$ correspond to identifiers for the watchtowers 50, where the values of s can be interpreted as an integer. Additionally, let each verifiable random value $\xi$ provided by the decentralized random beacon 40 also be interpreted as an integer. For each cycle, a random leader from the watchtowers 50 is be selected by choosing the watchtower 50 has an identifier s that is closest to, but not greater than, the verifiable random value $\xi$ last emitted by the decentralized random beacon 40. Additionally, in the case that an adversary might be empowered to choose an identity at random, the randomness of the beacon 40 can be folded into the identifiers s of the watchtowers 50 in order to prevent censorship attacks against a given set member. These attacks are possible, under a non-randomized identifier space, because a malicious party may randomly select an identifier such that it closely bounds a key that the malicious party wishes to censor. In order to prevent this attack, a random leader from the watchtowers 50 can instead be selected by choosing the watchtower 50 that has a hash $H(s_i \| r)$ that is closest to, but not greater than, the verifiable random value $\xi$ last emitted by the decentralized random beacon 40, where the hash $H(s_i \| r)$ is of its respective identifier $s_i$ concatenated with a random value r. In this way, the distribution of identifiers, in the integer space defined by the security parameter of the hash function $H(\ )$, is well distributed and randomized for each new verifiable random value of the decentralized random beacon 40.

With continued reference to FIG. 3, the advertising blockchain $BC_{Ad}$ includes at least one identity registry smart contract 202 that records the particular computing devices and/or software instances that are registered with and allowed to interact with the advertising blockchain $BC_{Ad}$. In particular, the identity registry smart contract 202 includes logic for adding and removing entities from (i) a list of watchtower entities 204 that operate and maintain the advertising blockchain $BC_{Ad}$, (ii) a list of advertiser entities 206 that are allowed to run advertising campaigns using the advertising blockchain $BC_{Ad}$, (iii) a list of publisher entities 208 that are allowed to serve advertisements of the advertising campaigns on the advertising blockchain $BC_{Ad}$, and (iv) a list of agent software entities 210 that are allowed to retrieve advertisements of the advertisement campaigns using the advertising blockchain $BC_{Ad}$ for presentation in conjunction with publisher media content.

The watchtowers 50 each have unique cryptographic identities $y_W$ which are registered with the advertising blockchain $BC_{Ad}$. The cryptographic identities $y_W$ are public keys from corresponding public-private key pairs $(y_W, x_W)$, such that $y_W = g^{x_W}$ in an asymmetric cryptographic system in which the private keys $x_W$ are capable of generating secure digital signatures that are verifiable with the respective public key $y_W$ to prove possession of the respective private key $x_W$ by the signer. In at least one embodiment, the list of watchtower entities 204 comprises a list of these unique cryptographic identities $y_W$.

Similarly, the advertiser devices 70 and the publisher devices 80 also have unique cryptographic identities $y_{Ad}$ and $y_{Pub}$, respectively, which are registered with the advertising blockchain $BC_{Ad}$. The cryptographic identities $y_{Ad}$ and $y_{Pub}$ are public keys from corresponding public-private key pairs $(y_{Ad}, x_{Ad})$, such that $y_{Ad} = g^{x_{Ad}}$ and $(y_{Pub}, x_{Pub})$ such that $y_{Pub} = g^{x_{Pub}}$, respectively, in an asymmetric cryptographic system in which the private keys $x_{Ad}$ and $x_{Pub}$ are capable of generating secure digital signatures that are verifiable with the respective public key $y_{Ad}$ or $y_{Pub}$ to prove possession of the respective private key $x_{Ad}$ or $x_{Pub}$ by the signer. In at least one embodiment, the list of advertiser entities 206 comprises a list of these unique cryptographic identities $y_{Ad}$ and the list of publisher entities 208 comprises a list of these unique cryptographic identities $y_{Pub}$. In order to register with the list of advertiser entities 206 or the list of publisher entities 208, an advertiser device 70 or a publisher device 80 initiates a transaction with the identity registry smart contract 202. After some kind of validation and/or fee payment, the identity registry smart contract 202 is executed by one or more of the watchtowers 50 to add the unique cryptographic identities $y_{Ad}$ of the advertiser device 70 to the list of advertiser entities 206 or add the unique cryptographic identities $y_{Pub}$ of the publisher device 80 to the list of publisher entities 208.

Finally, the agent software 65 of each consumer device 60 also have unique cryptographic identities $y_{Ag}$ which are registered with the advertising blockchain $BC_{Ad}$. The cryptographic identities $y_{Ag}$ are public keys from corresponding public-private key pairs $(y_{Ag}, x_{Ag})$, such that $y_{Ag} = g^{x_{Ag}}$ in an asymmetric cryptographic system in which the private keys $x_W$ are capable of generating secure digital signatures that are verifiable with the respective public key $y_{Ad}$ to prove possession of the respective private key $x_{Ag}$ by the signer. In at least one embodiment, the list of agent entities 210 comprises a list of these unique cryptographic identities $y_{Ag}$. As will be discussed in greater detail below, the agent software 65 of each consumer device 60 will also utilize short-term ephemeral cryptographic identities to maintain anonymity during the advertisement targeting processes described herein. As such, these unique cryptographic identities $y_{Ag}$ which are registered with the advertising blockchain $BC_{Ad}$ and stored in the list of agent software entities 210 will be referred to herein as the long-term cryptographic identities $y_{Ag}$.

As noted above, each watchtower 50 has a duty of care to the network and plays a supervisory or oversight role with respect to consumer devices 60 that operate with a particular variant of the agent software 65 that is produced by the entity that operates a respective watchtower 50. To this end, the identity registry smart contract 202 includes a requirement that a fee or stake, for example in the form of a digital currency, must be deposited into the identity registry smart contract 202, or into some other escrow account system, in order for a respective consumer device 60 to be registered with the identity registry smart contract 202 and for the respective long-term cryptographic identity $y_{Ag}$ of the consumer device 60 to be added to the list of agent software entities 210 stored on the advertising blockchain $BC_{Ad}$. In some embodiments, the watchtowers 50 are responsible for paying the required fee or stake for registering the long-term cryptographic identities $y_{Ag}$ of the consumer devices 60 that run the particular variant of the agent software 65 produced by the operator of the respective watchtower 50, as well as some base fee or stake for initially registering their own cryptographic identity $y_W$.

The particular watchtower 50 that funded the registration of a particular consumer device 60 is referred to herein as the "controlling" watchtower 50 with respect to the particular consumer device 60. In at least one embodiment, the identity registry smart contract 202 includes logic for storing, on the advertising blockchain $BC_{Ad}$, an association between the long-term cryptographic identities $y_{Ag}$ of the consumer devices 60 and the cryptographic identity $y_W$ of their controlling watchtower 50. In this way, each watchtower 50 is publicly associated with a particular subset of the long-term cryptographic identities $y_{Ag}$ in the list of agent software entities 210. In some embodiments, the watchtowers 50 each also store in the memory 54 an isolated registry of those long-term cryptographic identities $y_{Ag}$ that it has funded the registration of.

In at least one embodiment, in order to claim a cryptographic identity, in the advertising blockchain $BC_{Ad}$, the processor 62 of a consumer device 60 first claims an identity that is known to the controlling watchtower 50. Particularly, the processor 62 signs a new long-term cryptographic identity $y_{Ag}$, under a private key provided by the controlling watchtower 50 and transmits a claiming message having the long-term cryptographic identity $y_{Ag}$ to the controlling watchtower 50. On receipt of a valid claiming message under the known cryptographic identity, the processor 52 of the controlling watchtower 50 generates a digital signature of the provided long-term cryptographic identity $y_{Ag}$ in the claiming message and transmits it to the agent software 65 of the consumer device 60. This digital signature is preferably verifiable with the public key $y_W$ of the controlling watchtower 50. The returned digital signature of the corresponding watchtower 50 acts as a proof of authentication for the agent software 65, with respect to being the particular variant of the agent software 65 created by the signing watchtower 50. In order to register with the list of agent software entities 210, the processor 62 of a consumer device 60 initiates a transaction with the identity registry smart contract 202 and provides the digital signature of the controlling watchtower 50 as a proof of authentication. The identity registry smart contract 202 is executed to validate the digital signature of the controlling watchtower 50 and any additional information necessary to prevent fraudulent registrations. After such validation, identity registry smart contract 202 is executed to add the long-term cryptographic identity $y_{Ag}$ to the list of agent software entities 210.

Figure 4:
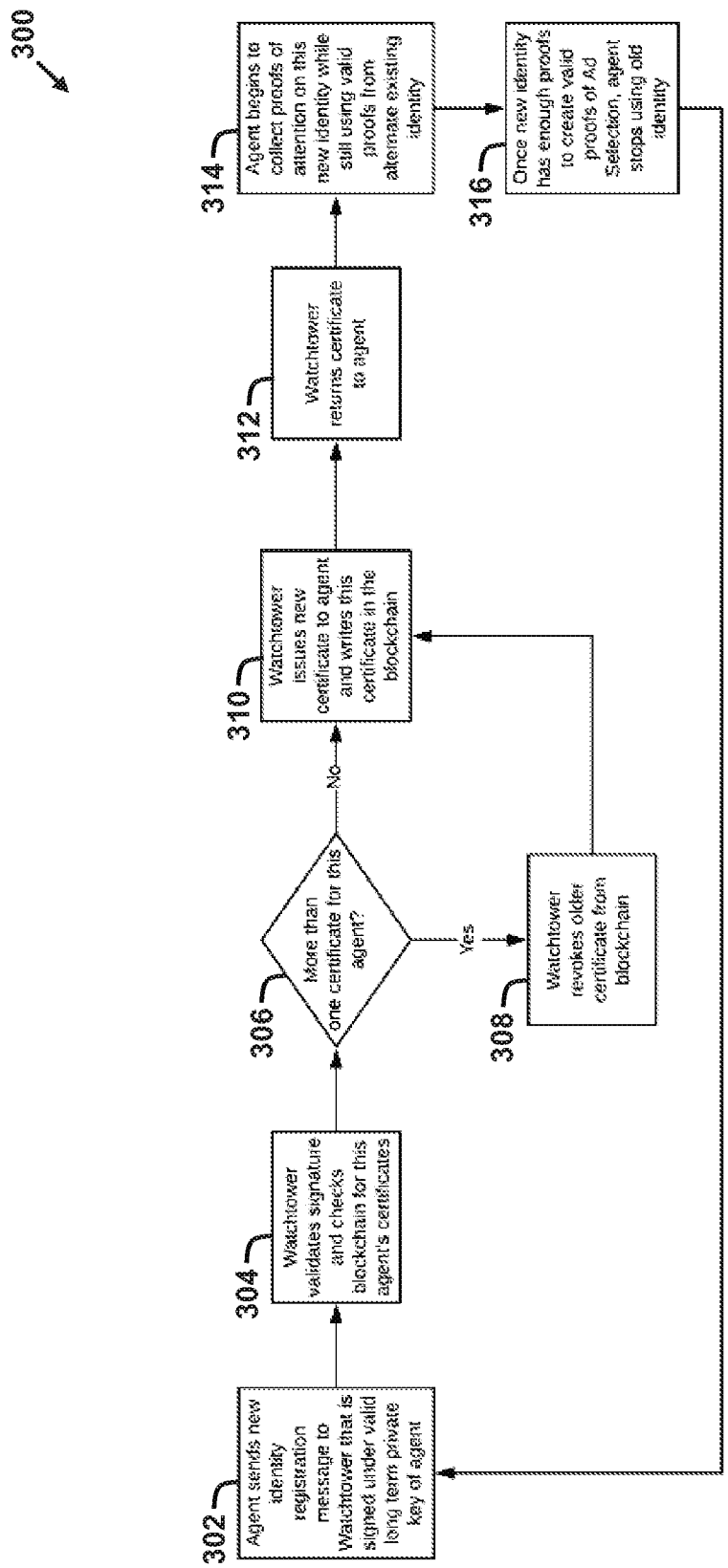
FIG. 4 shows a method for rotating ephemeral cryptographic identities for a consumer device.

FIG. 4 shows a method 300 for rotating ephemeral cryptographic identities for a consumer device. Particularly, as noted above, in addition to the long-term cryptographic identity $y_{Ag}$ that is stored in the list of agent software entities 210, the agent software 65 of each consumer device 60 will also utilize short-term ephemeral cryptographic identities to maintain anonymity during the advertisement targeting processes described herein. More particularly, each consumer device 60 maintains anonymity by utilizing a rotating pair of certificates $Cert_n$ and $Cert_{n-1}$ having respective ephemeral cryptographic identities $y_{Eph_n}$ and $y_{Eph_{n-1}}$, which are issued by the controlling watchtower 50 to certify that the consumer device 60 that holds the ephemeral cryptographic identities $y_{Eph_n}$ and $y_{Eph_{n-1}}$ is registered with the advertising blockchain $BC_{Ad}$ and has a long-term cryptographic identity $y_{Ag}$ in the list of agent software entities 210. As shown in FIG. 3, the certificates $Cert_n$ and $Cert_{n-1}$ are stored on the advertising blockchain $BC_{Ad}$ in a list of ephemeral identities 212 and in association with the cryptographic identity $y_W$ of the particular controlling watchtower 50 that issues the certificates. The ephemeral cryptographic identities $y_{Eph_n}$ and $y_{Eph_{n-1}}$ are public keys from corresponding public-private key pairs $$(y_{Eph_n}, x_{Eph_n}), \text{ such that } y_{Eph_n} = g^{x_{Eph_n}},$$

and $$(y_{Eph_{n-1}}, x_{Eph_{n-1}}),$$

such that $$y_{Eph_{n-1}} = g^{x_{Eph_{n-1}}},$$

respectively, in an asymmetric cryptographic system in which the private keys $x_{Eph_n}$ and $x_{Eph_{n-1}}$ are capable of generating secure digital signatures that are verifiable with the respective public key $y_{Eph_n}$ or $y_{Eph_{n-1}}$ to prove possession of the respective private key $x_{Eph_n}$ or $x_{Eph_{n-1}}$ by the signer.

With reference to FIG. 4, the method 300 begins with a step of sending, with a consumer device, a new identity registration message to the controlling watchtower (block 302). Particularly, the processor 62 of the consumer device 60 operates the communication module 66 to transmit a new identity registration message to the controlling watchtower 50. As a reminder, the controlling watchtower 50 is the watchtower 50 associated with and/or operated by the producer of the particular variant of agent software 65 used by the particular consumer device 60. The new identity registration message includes a new ephemeral cryptographic identity $y_{Eph_n}$ that the consumer device 60 intends to use when transacting with other devices of the system 10. In one embodiment, the processor 62 randomly selects the new ephemeral cryptographic identity $y_{Eph_n}$. In at least one embodiment, the new identity registration message includes a message signature under the long-term cryptographic identity $y_{Eph_n}$ of the consumer device 60, generated by the processor 62 with the corresponding private key $x_{Ag}$. In at least one embodiment, the processor 62 transmits the new identity registration message on a secure channel between the consumer device 60 and the controlling watchtower 50.

The method 300 continues with a step of validating, with the controlling watchtower, a signature of the identity registration message and checking for existing certificates for the consumer device on the advertising blockchain $BC_{Ad}$ (block 304). Particularly, in response to receiving the new identity registration message, the processor 52 of the controlling watchtower 50 validates the new identity registration message, in particular the message signature included therewith, using the long-term cryptographic identity $y_{Ag}$ of the consumer device 60. If the message signature of the new identity registration message is valid, then the processor 52 operates the communication module 56 to read the certificates from the list of ephemeral identities 212 on the advertising blockchain $BC_{Ad}$ to determine if any certificates have been issued for the particular consumer device 60.

The method 300 continues with a step of checking, with the controlling watchtower, whether more than one certificate for the consumer device is already stored on the advertising blockchain $BC_{Ad}$ (block 306). Particularly, the processor 52 of the controlling watchtower 50 checks whether more than one certificate has already been issued for the particular consumer device 60. In other words, the processor 52 checks if both a latest certificate $Cert_n$ and an older certificate $Cert_{n-1}$ already exist for the particular consumer device 60 in list of ephemeral identities 212 on the advertising blockchain $BC_{Ad}$.

The method 300 continues with a step of revoking, with the controlling watchtower, the older certificate for the consumer device if more than one certificate for the consumer device is already stored on the advertising blockchain $BC_{Ad}$ (block 308). Particularly, the processor 52 of the controlling watchtower 50, in response to more than one certificate for the particular consumer device 60 being stored in list of ephemeral identities 212 on the advertising blockchain $BC_{Ad}$, revokes the older certificate $Cert_{n-1}$ for the consumer device 60. In some embodiments, this revocation comprises operating the communication module 56 to delete the older certificate $Cert_{n-1}$ for the consumer device 60 from in list of ephemeral identities 212 on the advertising blockchain $BC_{Ad}$. In some embodiments, particularly in the case that the identity registry smart contract 202 manages the list of ephemeral identities 212, this revocation comprises operating the communication module 56 to transact with the identity registry smart contract 202 to delete the older certificate $Cert_{n-1}$ for the consumer device 60 from the list of ephemeral identities 212 on the advertising blockchain $BC_{Ad}$.

It will be appreciated that the check at block 306 and revocation at block 308 operate to ensure that the consumer device 60 has no more than two valid certificates at any given time. More particularly, with the exception of the time period after generation of a first certificate but before generation of a second certificate, each consumer device has exactly two valid certificates at any given time $Cert_n$ and $Cert_{n-1}$, where $Cert_n$ denotes the most recently issued certificate for the consumer device 60 and $Cert_{n-1}$ the second most recently issued certificate for the consumer device 60. Any certificates issued prior to the certificates $Cert_n$ and $Cert_{n-1}$ are revoked by the watchtower 50.

In either case, the method 300 continues with a step of issuing, with the controlling watchtower, a new certificate for the consumer device and writing the new certificate to the advertising blockchain $BC_{Ad}$ (block 310). Particularly, the processor 52 of the controlling watchtower 50 generates a new certificate $Cert_n$, which includes the ephemeral cryptographic identity $y_{Eph_n}$ and a signature of the ephemeral cryptographic identity $y_{Eph_n}$ generated using the private key $x_W$ of the controlling watchtower 50. The signature included in the certificate $Cert_n$ can be verified by an interested third party using the publicly known cryptographic identity $y_W$ of the controlling watchtower 50. In this way, an interested third party can know that the controlling watchtower 50 has verified that the consumer device 60 using the ephemeral cryptographic identity $y_{Eph_n}$ is registered with the advertising blockchain $BC_{Ad}$ and has a long-term cryptographic identity $y_{Ag}$ in the list of agent software entities 210, but the third party does not know the particular long-term cryptographic identity $y_{Ag}$ of the consumer device 60. Only a respective controlling watchtower 50 knows the association between ephemeral cryptographic identities $y_{Eph_n}$, $y_{Eph_{n-1}}$ and the corresponding long-term cryptographic identity $y_{Ag}$.

Once the new certificate $Cert_n$ has been generated, the processor 52 operates the communication module 56 to transmit a new identity response message to the consumer device 60, which includes the newly generated certificate $Cert_n$ for the new ephemeral cryptographic identities $y_{Eph_n}$. In response to receiving the new identity response message, the processor 62 of the consumer device 60 stores the newly generated certificate $Cert_n$ in the memory 64 for later usage.

In one embodiment, once the new certificate $Cert_n$ has been generated, the processor 52 operates the communication module 56 to write the new certificate $Cert_n$ to the list of ephemeral identities 212 on the advertising blockchain $BC_{Ad}$. In some embodiments, this writing of the new certificate $Cert_n$ to the list of ephemeral identities 212 comprises operating the communication module 56 to transact with the identity registry smart contract 202 to store the new certificate $Cert_n$ for the consumer device 60 in the list of ephemeral identities 212 on the advertising blockchain $BC_{Ad}$.

In at least one alternative embodiment, the list of ephemeral identities 212 stores cryptographic accumulators that include the certificates. Thus, the processor 52 operates the communication module 56 to write a cryptographic accumulator including new certificate $Cert_n$ to the list of ephemeral identities 212 on the advertising blockchain $BC_{Ad}$. In some embodiments, this writing of the cryptographic accumulator to the list of ephemeral identities 212 comprises operating the communication module 56 to transact with the identity registry smart contract 202 to store the cryptographic accumulator in the list of ephemeral identities 212 on the advertising blockchain $BC_{Ad}$.

In at least one further alternative embodiment, the list of ephemeral identities 212 stores an identifier, such as a certificate serial number, rather than the certificates themselves. The certificate serial number is universally unique serial number. Thus, the processor 52 operates the communication module 56 to write an certificate serial number to the list of ephemeral identities 212 on the advertising blockchain $BC_{Ad}$. In some embodiments, this writing of the certificate serial number to the list of ephemeral identities 212 comprises operating the communication module 56 to transact with the identity registry smart contract 202 to store the certificate serial number in the list of ephemeral identities 212 on the advertising blockchain $BC_{Ad}$.

The method 300 continues with a step of collecting, with the consumer device, proofs of interest on the new ephemeral cryptographic identity, while still using proofs of interest on old ephemeral cryptographic identity (block 314) and, once the new ephemeral cryptographic identity has enough proofs of interest to create valid proofs of ad targeting, ceasing use of the old ephemeral cryptographic identity (block 316). Particularly, as will be discussed in greater detail below, when interacting with publisher device 80 and the publisher's media content, the consumer devices 60 will generated proofs of interest, which are stored in the private consumer data 67 and prove that the consumer device 60 interacted with a particular type of media content, thus indicating interest in the particular type of media content. These proofs of interest are each collected under the latest ephemeral cryptographic identity $y_{Eph_n}$ of the consumer device 60, rather than the long-term cryptographic identity $y_{Ag}$ of the consumer device 60, so as to maintain anonymity of the consumer device 60.

As will be discussed in greater detail below, these proofs of interest are aggregated to form proofs of ad targeting that prove that the consumer associated with the consumer device 60 satisfies a targeting model for a particular ad campaign or particular advertisement. When the consumer device acquires the latest ephemeral cryptographic identity $y_{Eph_n}$, the consumer device 60 will begin generating the proofs of interest under the latest ephemeral cryptographic identity $y_{Eph_n}$, but will continue to generate proofs of ad targeting with proofs of interest that were collected under the previous ephemeral cryptographic identity $y_{Eph_{n-1}}$ until a sufficient amount of proofs of interest have been collected under the latest ephemeral cryptographic identity $y_{Eph_n}$. Particularly, the processor 62 checks, either periodically or after generating each proof of interest, whether a sufficient amount of proofs of interest have been collected under the latest ephemeral cryptographic identity $y_{Eph_n}$. In one embodiment, a threshold number of proofs of interest is considered a sufficient amount of proofs of interest. In other embodiments, other considerations can be taken into account, such as requiring proofs of interest relating to at least a threshold number of different types of media content.

Once a sufficient amount of proofs of interest have been collected under the latest ephemeral cryptographic identity $y_{Eph_n}$, the consumer device 60 stops generating proofs of ad targeting with proofs of interest that were collected under the previous ephemeral cryptographic identity $y_{Eph_{n-1}}$ and, instead, begins generating proofs of ad targeting with proofs of interest that were collected under the latest ephemeral cryptographic identity $y_{Eph_n}$. In one embodiment, once a sufficient amount of proofs of interest have been collected under the latest ephemeral cryptographic identity $y_{Eph_n}$, the consumer device 60 returns to block 302 to acquire yet another new ephemeral cryptographic identity.

Ad Campaigns on the Advertising Blockchain

As discussed above, advertisers having a cryptographic identity $y_{Ad}$ registered with the list of advertiser entities 206 are authorized to run advertising campaigns using the advertising blockchain $BC_{Ad}$. As used herein, an "advertising campaign" or "ad campaign" refers to collection of information defining (i) at least one advertisement that can be served to a consumer by a publisher in conjunction with the publisher's media content and (ii) one or more constraints that limit how, when, and/or to whom the advertisement may be served by a publisher in order to receive credit and/or payment for an advertisement impression. As used herein with respect to advertisements and advertisement impression, a "constraint" refers to a value or set of data associated with particular rule that is understood to limit how, when, and/or to whom an advertisement can be presented in conjunction with media content to form a valid advertisement impression.

With reference to FIG. 3, the advertising blockchain $BC_{Ad}$ includes at least one ad campaign smart contract 214 that records ad campaign data 216 regarding a plurality of different ad campaigns being run by advertisers registered with the advertising blockchain $BC_{Ad}$. In order to run an ad campaign on the advertising blockchain $BC_{Ad}$, the processor 72 of an advertiser device 70 operates the communication module to send an ad campaign publication message to the ad campaign smart contract 214, which includes ad campaign information at least including information defining at least one advertisement that can be served to a consumer device 60 by a publisher in conjunction with the publisher's media content and an associated set of constraints defining outline how, when, and/or to whom the advertisement may be served by a publisher in order to receive credit and/or payment for an advertisement impression. In at least one embodiment, the new identity registration message includes a message signature under the cryptographic identity $y_{Ad}$ of the consumer device 60, generated by the processor 62 with the corresponding private key $x_{Ad}$.

The at least one ad campaign smart contract 214 includes logic for receiving ad campaign publication messages, verifying that the advertiser is authorized to run ad campaigns on the advertising blockchain $BC_{Ad}$, and storing the received ad campaign information in the ad campaign data 216 on the advertising blockchain $BC_{Ad}$. Particularly, in response to receiving an ad campaign publication message, the processor 52 of one or more watchtowers 50 executes instructions of the ad campaign smart contract 214 to read from the list of advertiser identities 208 and verify that the cryptographic identity $y_{Ad}$ of the advertiser device 70 from which the ad campaign publication message was received is registered with the list of advertiser entities 206. Moreover, the processor 52 of one or more watchtowers 50 executes instructions of the ad campaign smart contract 214 to check the authenticity of the ad campaign publication message by verifying the message signature using the cryptographic identity $y_{Ad}$. If the ad campaign publication message is validated, then the processor 52 of one or more watchtowers 50 operates the communication module 56 to write the received ad campaign information to the ad campaign data 216 on the advertising blockchain $BC_{Ad}$. Additionally, the processor 52 of one or more watchtowers 50 executes instructions of the ad campaign smart contract 214 to select, and write to the ad campaign data 216 on the advertising blockchain $BC_{Ad}$, a universally unique ad campaign ID for the ad campaign, which can be used to identify the particular ad campaign. Alternatively, the ad campaign ID can be selected by some other party or mechanism, besides the ad campaign smart contract 214.

As noted above, the ad campaign information provided with the ad campaign publication message at least includes information defining at least one advertisement that can be served to a consumer device 60 by a publisher in conjunction with the publisher's media content. Particularly, in at least one embodiment, the ad campaign information that is published to the advertising blockchain $BC_{Ad}$ includes the information, such as a set of URLs or other retrieval instructions, which can be used to retrieve at each advertisement in the ad campaign (i.e., the audio and/or visual media content that is actually presented to a consumer). Additionally, for each advertisement in the ad campaign, the ad campaign information also defines the media content type, media dimensions, media duration, etc. that define the form in which the advertisement can be presented to a consumer. Finally, for each advertisement in the ad campaign, the ad campaign information also includes a set of classifiers that define a categorization of the advertisement media, which are selected from a predefined set of allowable classifiers. In one embodiment, these classifiers are similar, if not equivalent to classifiers used to classify publisher media content, discussed in greater detail below.

As noted above, the ad campaign information provided with the ad campaign publication message also includes a set of constraints for the ad campaign and/or for individual advertisements in the ad campaign. The set of constraints at least includes a targeting model that defines a target audience for an ad campaign or individual advertisements in the ad campaign. In some embodiments, the targeting model takes the form of a query string that defines a target audience. As used herein, a "query string" refers to a string, vector of strings, or the like representing a query that can be evaluated against one or more data points to provide a result, answer, or output. Particularly, as discussed in greater detail below, the targeting model and/or the query strings can be evaluated against proofs of interest collected by the consumer devices 60 that prove that the respective consumer device 60 interacted with a particular type of media content, thus indicating interest in the particular type of media content.

In some embodiments, the query string may comprise one or more Boolean test statements. Each Boolean test statement seeks an answer or output with respect to attributes of the individuals about which the private consumer data 67 pertains. The Boolean test statements include combinational logic for processing one or more data points to arrive at a true or false answer. For example, in an advertising context a Boolean test statement might define a target audience for an advertisement. For example a target audience for an avocado-toast with eggs advertisement, might be defined by the Boolean test statement: "Consumer is an Avocado-Toast intender and lives in Brooklyn and is vegetarian but is not vegan." An answer of "true" to this statement can indicate the consumer falls within the target audience. An answer of "false" indicates the consumer may not fall within the target audience. For example, while the consumer may be a Brooklynite avocado-toast intender, who frequents vegetarian recipe sites, she may be vegan and therefore may not buy the advertiser's avocado-toast with eggs.

In some embodiments, the query string may comprise a set of program instructions with trained weight/kernel values corresponding a machine learning model that is configured to, based on input data points, output a true or false value or a confidence metric, such as a value between 0.0 and 1.0. It will be appreciated that machine learning is process that uses statistical inference, randomness, and brute force computation to ascertain a ruleset based on data alone. For example, in an advertising context an exemplary machine learning model might be configured to determine whether a consumer is within a target audience for an avocado-toast with eggs advertisement by analyzing thousands of purchase receipts and demographic data associated with the consumer.

In addition to the targeting model and/or query string, the ad campaign information provided with the ad campaign publication message includes additional constraints. Particularly, the additional constraints at least include, for each advertisement in the ad campaign, a maximum amount that the advertiser is willing to pay to for an impression of the advertisements by a consumer satisfying the targeting model. Additionally, in some embodiments, the additional constraints include a set of classifiers identifying the acceptable (or unacceptable) categories of publisher media content that the advertisement is allowed to be presented in conjunction with, which acts as a context control mechanism for the advertiser. Additionally, in some embodiments, the additional constraints include a publisher whitelist or a publisher blacklist defining a set of publishers that are allowed or not allowed to present advertisements of the ad campaign (or a particular advertisement) in conjunction with their media content. Finally, in some embodiments, the additional constraints include an agent whitelist or agent blacklist defining a set of consumer devices 60, a set of instances of agent software 65, and/or a set of particular variants of agent software 65 that are allowed to be presented with advertisements of the ad campaign (or a particular advertisement).

In at least one embodiment, the ad campaign information that is published to the advertising blockchain $BC_{Ad}$ includes a signature of the ad campaign information, in particular a signature of the advertiser constraints $\sigma_{AdConstraints}$. Particularly, the processor 72 generates the signature of the advertiser constraints $\sigma_{AdConstraints}$ by signing at least the advertiser constraints of the ad campaign information using the cryptographic identity $y_{Ad}$ of the advertiser device 70. In at least one embodiment, a signature of the advertiser constraints $\sigma_{AdConstraints}$ is generated for each advertisement included in the respective ad campaign. The signature of the advertiser constraints $\sigma_{AdConstraints}$ is included in the ad campaign publication message sent to the ad campaign smart contract 214 and is written to the ad campaign data 216 on the advertising blockchain $BC_{Ad}$. As will be discussed in greater detail below, consumer devices 60 can use the signature of the advertiser constraints $\sigma_{AdConstraints}$ to generate proofs of ad selection that prove that a selected and served advertisements satisfies any constraints of the advertiser and of the publisher.

In at least one embodiment, the processor 72 of the advertiser device 70 receives a plurality of user inputs via the user interface 78. Based on the user inputs, the processor 72 generates the targeting model and/or query string that defines the target audience for each advertisement or the ad campaign. Additionally, based on the user inputs, the processor 72 generates the additional constraints defining how, when, and/or to whom an advertisement can be presented in conjunction with media content to form a valid advertisement impression.

After transmitting the ad campaign publication message to the ad campaign smart contract 214, the advertiser can optionally modify some or all of the ad campaign information that is written to the ad campaign data 216 on the advertising blockchain $BC_{Ad}$. Particularly, in one embodiment, to modify the ad campaign information, the processor 72 of the advertiser device 70 operates the communication module 76 to transmit an ad campaign modification message to the ad campaign smart contract 214, including the modified ad campaign information and the ad campaign ID. In response to receiving the ad campaign modification message, the processor 52 of one or more watchtowers 50 executes instructions of the ad campaign smart contract 214 to verify that the campaign modification message was sent by the cryptographic identity $y_{Ad}$ who originally created the ad campaign and writes the modified ad campaign information to the ad campaign data 216 on the advertising blockchain $BC_{Ad}$.

The publication of the ad campaign information to the advertising blockchain $BC_{Ad}$ acts as a notification to other devices of the system 10 that the ad campaign is pending. However, the advertisements of the ad campaign cannot be used for advertisement impressions until the ad campaign is activated by the advertiser. Additionally, the advertiser can pause, resume, or terminate the ad campaign as necessary.

In some embodiments, in order to activate the ad campaign, the processor 72 operates the communication module 76 to transmit an ad campaign activation message to the ad campaign smart contract 214. In some embodiments, the ad campaign activation message may optionally include a time in the future that the ad campaign is to be activated, as well as a time in the future that the ad campaign is to be terminated. In response to receiving the ad campaign activation message, the processor 52 executes instructions of the ad campaign smart contract 214 to write to the ad campaign data 216 on the advertising blockchain $BC_{Ad}$ some indication of the time frame during which the ad campaign is active and/or some indication that the ad campaign is has been activated.

In some embodiments, in order to terminate the ad campaign, the processor 72 operates the communication module 76 to transmit an ad campaign termination message to the ad campaign smart contract 214. In some embodiments, the ad campaign termination message may optionally include a time in the future that the ad campaign is to be terminated. In response to receiving the ad campaign termination message, the processor 52 executes instructions of the ad campaign smart contract 214 to write to the ad campaign data 216 on the advertising blockchain $BC_{Ad}$ some indication of the time at which the ad campaign is to be terminated and/or some indication that the ad campaign is has been terminated.

In some embodiments, in order to pause the ad campaign, the processor 72 operates the communication module 76 to transmit an ad campaign pause message to the ad campaign smart contract 214. In some embodiments, the ad campaign pause message may optionally include a time in the future that the ad campaign is to be paused. In response to receiving the ad campaign pause message, the processor 52 executes instructions of the ad campaign smart contract 214 to write to the ad campaign data 216 on the advertising blockchain $BC_{Ad}$ some indication of the time at which the ad campaign is to be paused and/or some indication that the ad campaign is has been paused.

In some embodiments, in order to resume the ad campaign, the processor 72 operates the communication module 76 to transmit an ad campaign resume message to the ad campaign smart contract 214. In some embodiments, the ad campaign resume message may optionally include a time in the future that the ad campaign is to be resumed. In response to receiving the ad campaign resume message, the processor 52 executes instructions of the ad campaign smart contract 214 to write to the ad campaign data 216 on the advertising blockchain $BC_{Ad}$ some indication of the time at which the ad campaign is to be resumed and/or some indication that the ad campaign is has been resumed.

Figure 5:
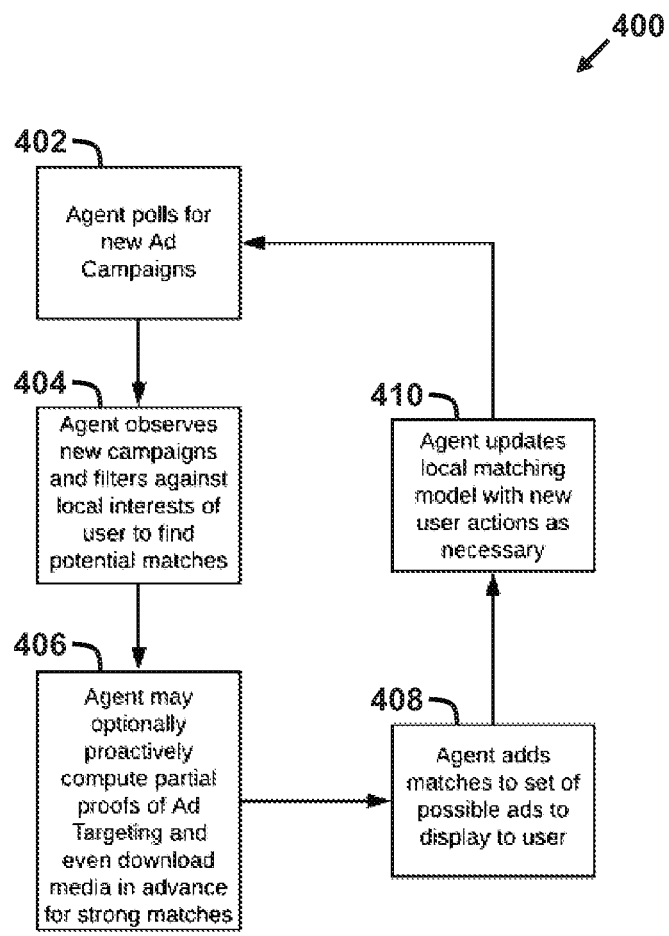
FIG. 5 shows a method for identifying a set of suitable advertisements for presentation at a consumer device.

FIG. 5 shows a method 400 for identifying a set of suitable advertisements for presentation at a consumer device. Particularly, the consumer device 60 regularly maintains a list of advertisements and/or ad campaigns for which the associated consumer satisfies the targeting model. In this way, when ad advertisement is required, the advertisement selection process is simplified because the consumer device 60 needs only to consider the compatibility of the publisher and advertiser constraints, because the targeting models have already been applied. In some cases, the advertisement media itself can also be retrieved preemptively. These features advantageously provide for a more seamless interaction for the consumer.

The 400 begins with a step of polling, with the consumer device, new ad campaigns (block 402). Particularly, the processor 62 of the consumer device 60 operates the communication module 66 to read ad campaign information from the ad campaign data 216 on the advertising blockchain $BC_{Ad}$ and to at least retrieve the targeting models for the ad campaigns in the ad campaign data 216 on the advertising blockchain $BC_{Ad}$ so that the targeting models can be tested against the private consumer data 67 to find potential advertisements for later presentation at the consumer device 60. However, in alternative embodiments, the consumer device 60 can instead be notified of all ad campaigns or of ad campaigns of high potential interest, for example by the controlling watchtower 50.

The method 400 continues with a step of observing, with the consumer device, new ad campaigns and filters the new ad campaigns against local interests of the consumer to find potential matches (block 404). Particularly, the processor 62 of the consumer device 60 identifies new ad campaigns in the ad campaign information that was retrieved from the ad campaign data 216 on the advertising blockchain $BC_{Ad}$. For each targeting model of each identified new ad campaign, the processor 62 applies the respective targeting model to the private consumer data 67 to determine if the consumer associated with the consumer device 60 fits within the target audience defined by the targeting model. Particularly, as will be discussed in greater detail below, the private consumer data 67 includes a plurality of proofs of interest that are collected when interacting with a publisher device 80 and the publisher's media content and that prove that the consumer device 60 interacted with a particular type of media content, thus indicating interest in the particular type of media content. As noted above, the targeting model may take the form of a query string that defines a target audience and that can be evaluated against one or more data points to provide a result, answer, or output. Thus, for each targeting model of each identified new ad campaign, the processor 62 evaluates the query string and/or targeting model against proofs of interest collected by the consumer devices 60 under the latest ephemeral cryptographic identity $y_{Eph_n}$ and/or proofs of interest collected by the consumer devices 60 under the previous ephemeral cryptographic identity $y_{Eph_{n-1}}$, as described above.

The method 400 continues with the proactive optional step of computing, with the consumer device, partials proofs of ad targeting and downloading advertisement media for strong matches (block 406). Particularly, in some embodiments, the processor 62 of the consumer device 60 proactively calculates partial proofs of at targeting for particularly strong matches. Particularly, as will be discussed in greater detail below, when interacting with publisher devices 80 and consumer publisher media content, the consumer device 60 will present matching advertisements to the consumer such that the publisher can receive credit for an advertisement impression. In doing so, the consumer device 60 will generates proofs of ad targeting based on the proofs of interest stored in the private consumer data 67 that prove that the consumer fits within the targeting model for the advertisement that was presented to the consumer. In some embodiments, for particularly strong matches, the processor 62 calculate partial proofs of at targeting ahead of time to provide a more seamless user experience and faster provision of the proofs of ad targeting. The process that is used to generate the proofs of at targeting is discussed in greater detail below.

In some embodiments, the ad campaigns are considered "strong" matches are those having the largest amount of proofs of interest that can be used as evidence of the consumer fitting with the target audience defined by the targeting model of the ad campaign. Alternatively, in the case that the targeting model comprises a machine learning model that is configured to output a confidence metric, such as a value between 0.0 and 1.0, the ad campaigns are considered "strong" matches are those having a higher confidence metric.

In some embodiments, the processor 62 of the consumer device 60 also proactively retrieves advertisement media for particularly strong matches. As described above, the ad campaign information that is published by the advertiser to the ad campaign data 216 on the advertising blockchain $BC_{Ad}$ includes information, such as a set of URLs or other retrieval instructions, which can be used to retrieve at each advertisement in the ad campaign (i.e., the audio and/or visual media content that is actually presented to a consumer). In some embodiments, for particularly strong matches, the processor 62 operates the communication module 66 to retrieve the advertisement media and stores the advertisement media on in the memory 64 for later usage.

In one embodiment, the processor 62 retrieves advertisement media in some manner that does not allow the publisher or advertiser to directly identify the IP address of the retrieving party to the device on which the agent software is running. Examples of such technology include retrieval of the media content from a P2P file sharing system such as IPFS. Alternatively, the processor 62 retrieves advertisement media through a system that uses anonymized routing. Existing systems that allow for anonymized routing include, but are not limited to I2P, Tor, and Freenet. Alternatively, the processor 62 retrieves advertisement media from a private database using privacy preserving query mechanisms that may include but are not limited to such technologies as data querying and data retrieval under homomorphic encryption and/or overlapping data shards with error correction coding.

The method 400 continues with a step of adding matching advertisements to a set of possible advertisements to display to the consumer (block 408). Particularly, the processor 62 of the consumer device 60 stores, in a list of matching advertisements on the memory 64, any of the new ad campaigns for which the consumer associated with the consumer device 60 fits within the target audience defined by the targeting model, and for which the private consumer data 67 stores proofs of interest proving that the consumer fits within the target audience. In some embodiments, the list of matching advertisements includes a predetermined minimum or maximum amount of advertisements and/or ad campaigns. In some embodiments, the list of matching advertisements includes a predetermined minimum or maximum amount of advertisements and/or ad campaigns for each possible type of advertisement that might be needed, so that consumer device 60 is prepared to present a variety of different types of advertisements as needed while consuming publisher media content.

Finally, the method 400 continues with a step of updating the set of possible advertisements with new user interest information as necessary (block 410). Particularly, the processor 62 of the consumer device 60 adds, removes, or reorganizes ad campaigns in the list of matching advertisements based on newly collected proofs of interest, based on proof of interest becoming too old, or based on ad campaigns being paused or terminated. Particularly, as new proof of interest are collected (using the processes discussed below), the processor 62 reevaluates the query strings and/or targeting models of the ad campaigns in the list of matching advertisements against the proofs of interest collected by the consumer devices 60. At the time of reevaluation, the particular set of proofs of interest in the private consumer data 67 may include new proofs of interests and may omit proofs of interest that have since expired or have otherwise been removed. Additionally, the processor 62 may operate the communication module 66 to read ad campaign information from the ad campaign data 216 on the advertising blockchain $BC_{Ad}$ for the advertisements in the list of matching advertisements and remove any advertisements from the list of matching advertisements if the ad campaigns have been pause or terminated.

Providing Advertisement Impressions with the Advertising Blockchain

As described above, publishers compelling media content provide that a consumer interested in consuming. In exchange for being allowed to consume the publisher's media content, the consumer may be required view or hear an advertisement alongside the publisher's media content or prior to consuming the publisher's media content. Each piece of media content provided by a publisher is categorized by a set of classifiers, which are selected from a predefined set of allowable classifiers. An example of such a categorization system may be found in the IAB Content Taxonomy Mapping. The predefined set of allowable classifiers may be similar or equivalent to the classifiers used to categorized advertisement media content, discussed above. This categorization system may either operate on a self-assignment basis in which the publisher categorized its own media content, or by a process in which an independent party or parties categorized the publisher media content.

Each publisher assigns cryptographic keys $y_{Map}$ to particular classifiers or group of classifiers from the predefined set of allowable classifiers. In at least one embodiment, the assigned cryptographic keys $y_{Map}$ are from corresponding public-private key pairs $(y_{Map}, x_{Map})$, such that $y_{Map} = g^{x_{Map}}$ in an asymmetric cryptographic system in which the private keys $x_{Map}$ are capable of generating secure digital signatures that are verifiable with the respective public key $y_{Map}$ to prove possession of the respective private key $x_{Map}$ by the signer. In at least one embodiment, these cryptographic keys are public keys generated using a type 3 pairing friendly elliptic curve. These cryptographic keys $y_{Map}$ will be used to by the publisher device 80 to generate signatures that map publisher media content to the particular classifiers or group of classifiers that correspond to the respective cryptographic key $y_{Map}$ under which the signature was generated. Thus, these cryptographic keys $y_{Map}$ are referred to herein as content mapping keys $y_{Map}$. As used herein, a "content mapping key" is a public key that is associated, preferably publicly associated, with a particular classifier or group of classifiers that indicates a particular quality or nature of the interaction between the devices (e.g., a category classification of the requested media content).

The publisher may assigned multiple different content mapping keys $y_{Map}$ to particular classifier or group of classifiers, such that the different keys associated with the particular classifier or group of classifiers have a special meaning to the publisher beyond the publicly understood meaning of the particular classifier or group of classifiers to which the keys are associated. As an example, a particular content mapping key $y_{Map}$ might represent a particular good or service being bought or placed in a shopping cart, or otherwise identify specific actions or items relating the publisher's media content. Thus, assigning multiple different content mapping keys $y_{Map}$ to particular classifier or group of classifiers enables the publisher to utilize a level of classification granularity that exceeds that which is inherently provided by the predefined set of allowable classifiers With reference to FIG. 3, the advertising blockchain $BC_{Ad}$ includes at least one publisher content mapping smart contract 218 that records content mapping keys $y_{Map}$ utilized by each publisher and particular classifier or group of classifiers to which each content mapping key $y_{Map}$ is associated. Particularly, the at least one publisher content mapping smart contract 218 includes logic for receiving content mapping keys $y_{Map}$ from publishers and writing them to a list of publisher content mapping keys 220 on the advertising blockchain $BC_{Ad}$ with an indication of the particular classifier or group of classifiers to which each content mapping key $y_{Map}$ is associated. In one embodiment, in order to publish a set of content mapping keys $y_{Map}$, the processor 82 of a publisher device 80 operates the communication module 86 to transmit a content mapping key message to the publisher content mapping smart contract 218, which includes the set of content mapping keys $y_{Map}$ and an indication of the particular classifier or group of classifiers to which each content mapping key $y_{Map}$ is associated. In response to receiving the content mapping key message, the processor 52 of one or more watchtowers executes instructions of the publisher content mapping smart contract 218 to write, to the list of publisher content mapping keys 220 on the advertising blockchain $BC_{Ad}$, the content mapping keys $y_{Map}$ and the particular classifier or group of classifiers to which each content mapping key is associated. In at least one embodiment, the content mapping key message includes a message signature under the cryptographic identity $y_{Pub}$ of the publisher device 80, generated by the processor 82 with the corresponding private key $x_{Pub}$.

In some embodiments, the publishers rotate the set of content mapping keys $y_{Map}$ that is uses to categorize its media content at regular intervals. In particular, in at least one embodiment, each publisher maintains at any given time two sets of content mapping keys, a latest set of content mapping keys $y_{Map_n}$ and a previous set of content mapping keys $y_{Map_{n-1}}$, both of which are stored in the list of publisher content mapping keys 220 on the advertising blockchain $BC_{Ad}$. At regular intervals, the publisher generates a new set of content mapping keys $y_{Map_n}$, which causes the immediately preceding set of content mapping keys become the older set of content mapping keys $y_{Map_{n-1}}$ and causes the oldest set of content mapping $y_{Map_{n-2}}$ keys to be revoked. In one embodiment, in order to publish a new set of content mapping keys, the processor 82 operates the communication module 86 to transmit a content mapping key rotation message, which includes a new set of content mapping keys $y_{Map_n}$ and some indication of which of the previous content mapping keys each key replaces and/or some indication of the particular classifier or group of classifiers to which each content mapping key is to be associated. In response to receiving the content mapping key rotation message, the processor 52 of one or more watchtowers executes instructions of the publisher content mapping smart contract 218 to write, to the list of publisher content mapping keys 220 on the advertising blockchain $BC_{Ad}$, the new set of content mapping keys $y_{Map_n}$ and to delete and/or revoke the oldest set of content mapping keys $y_{Map_{n-2}}$.

It will be appreciated that this regular rotation and eventual revocation of content mapping keys $y_{Map}$ has the effect that signatures generated using the respective private keys $x_{Map}$ are only valid for a certain interval of time and cannot be verified after the content mapping keys $y_{Map}$ are eventually revokes. As will be described in greater detail below, these content mapping keys $y_{Map}$ are used in the generation of proofs of interest. Thus, the regular rotation and eventual revocation of content mapping keys $y_{Map}$ will cause eventual expiration of the proofs of interest generated using the content mapping keys $y_{Map}$.

Figure 6:
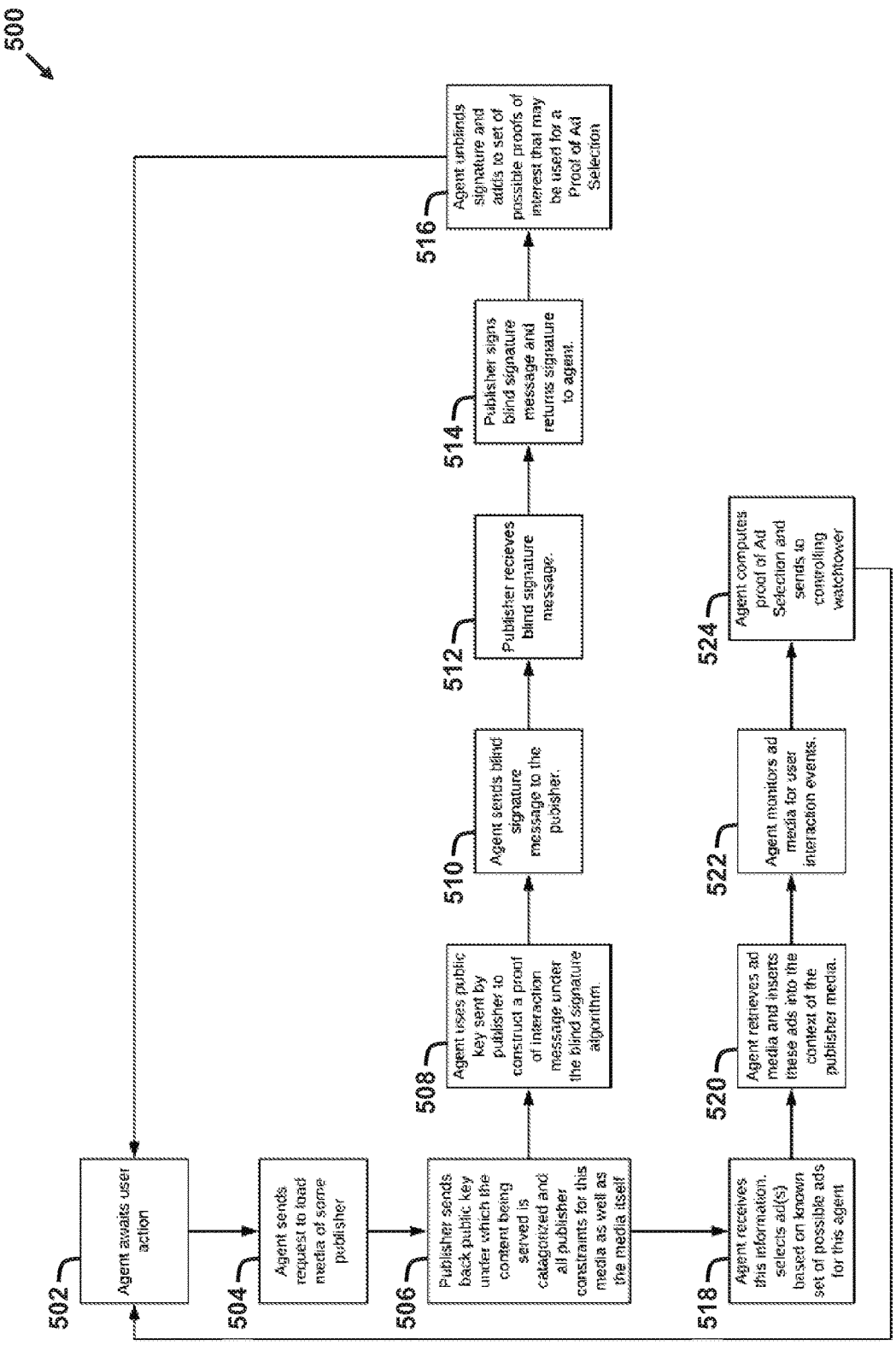
FIG. 6 shows a method for collecting proofs of interest with respect to publisher media content and for serving suitable advertisements in conjunction with publisher media content.

FIG. 6 shows a method 500 for collecting proofs of interest with respect to publisher media content and for serving suitable advertisements in conjunction with publisher media content. Particularly, as a consumer uses his or her consumer device to browse and consumer media content provided by publishers, such as a downloaded application, streamed media content, or Internet browser-based media content, the agent software 65 collects proofs of interest that prove that the consumer device 60 interacted with a particular type of media content, thus indicating interest in the particular type of media content. The agent software 65 uses these proofs of interest to generate proofs of ad targeting that prove the consumer fits within a targeting model for an advertisement that is to be was presented to the consumer in conjunction with. Finally, the agent software 65 also generates proofs of ad selection that prove that both advertiser constraints and publisher constraints are satisfied for a particular advertisement impression. These proofs advantageously minimize fraud with respect to the advertisement impressions bought and sold using the system 10 and the advertising blockchain $BC_{Ad}$. Furthermore, these proofs are advantageously generated in a manner that preserves the privacy of the consumer device 60 and, thus, the consumer.

The method 500 begins with steps of awaiting, with a consumer device, user action (block 502) and then sending, with the consumer device, a request to a publisher device to load publisher media content (block 504). Particularly, when a user wishes to retrieve or otherwise use publisher media content, the processor 62 of the consumer device 60 operates the communication module 66 to transmit a media content request message to a publisher device 80 that provides the media content that user would like to retrieve or otherwise use. In some embodiments, the media content request message includes some indication of the particular media content that the consumer would like to retrieve or otherwise use. It will be appreciated that, in some cases, the publisher media content is already stored on the memory 64 of the consumer device 60. For example, if the publisher media content is a video game or other interactive application, the media content request message is merely a notification to the publisher device 80 to provide the information required to serve an advertisement in conjunction with the video game or other interactive application. In other cases, however, the media content request message provokes the actual retrieval of the publisher media content, in addition to the information required to serve an advertisement in conjunction the publisher media content. In at least one embodiment, the media content request message also includes the latest certificate $Cert_n$ for the consumer device 60. In at least one embodiment, the media content request message includes a message signature under the latest ephemeral cryptographic identity $y_{Eph_n}$ of the consumer device 60, generated by the processor 62 with the corresponding private key $x_{Eph_n}$.

The method 500 continues with a step of sending, with the publisher device, the content mapping key under which the requested media content is categorized, as well as any publisher constraints for advertisements to be served in conjunction with the requested publisher media content (block 506). Particularly, in response to receiving the media content request message from the consumer device, the processor 82 of the publisher device 80 verifies the message signature and verifies that a corresponding certificate, or equivalent identifier, is stored in the list of ephemeral identities 212 on the advertising blockchain $BC_{Ad}$. If the media content request message is valid, the processor 82 operates the communication module 86 to transmit a publisher content message which includes a content mapping key $y_{Map}$ under which the requested publisher media content is categorized, as well as information regarding any publisher constraints with respect to advertisements that maybe served in conjunction with the requested publisher media content. In at least one embodiment, the publisher content message includes a message signature under the cryptographic identity $y_{Pub}$ of the publisher device 80, generated by the processor 82 with the corresponding private key $x_{Pub}$.

As described above, the content mapping key $y_{Map}$ corresponds to a particular classifier or group of classifiers that define a categorization of the requested publisher media content. In addition, since a publisher may utilize multiple different content mapping keys $y_{Map}$ that correspond to the same classifier or group of classifiers, the content mapping key $y_{Map}$ may also convey additional meaning to the publisher. As will be described in further detail below, the content mapping key $y_{Map}$ is utilized to generate a proof of interest with respect to the requested publisher media content that proves that the consumer device 60 requested and, thus, is interested in the requested publisher media content.

The requested publisher media content includes at least one location at which an advertisement can be presented in conjunction with the requested publisher media content. As used with respect to publisher media content, a "location" at which an advertisement can be presented refers to a position within or around visual media content, time, a time within a video or otherwise animated visual media content, a time within audio media content, or equivalent definable place, time, position, location, or the like within media content at which an advertisement can be presented. The publisher constraints at least include, for each location in the requested publisher media content at which an advertisement can or should be served, information that defines acceptable or compatible advertisement media content type, dimensions, duration, etc. For example, if the requested publisher media content is a web page having multi-media news article, there might be two locations at which in-line image-based advertisement can be served with a text portion of the multi-media news article, and a one location at which a video pre-roll type advertisement can be served with a video portion of the multi-media news article. In this example, the publisher constraints might include dimensions for the in-line image-based advertisements and a duration or aspect ratio for the video pre-roll type advertisement. Additionally, the publisher constraints at least include, for each location in the requested publisher media content at which an advertisement can or should be served, a minimum amount the publisher is willing to accept for an advertising impression at the respective location.

Additional publisher constraints may include a set of classifiers identifying the acceptable (or unacceptable) categories of advertisement media content that is allowed to be presented in conjunction with the requested publisher media content, which acts as a for context control mechanism for the publisher. Additional publisher constraints may an advertiser whitelist or an advertiser blacklist defining a set of advertisers that are allowed or not allowed to serve advertisements in conjunction the requested publisher media content.

In at least one embodiment, publisher content message further includes a signature of the publisher constraints $\sigma_{PubConstraints}$. Particularly, the processor 82 generates the signature of the publisher constraints $\sigma_{PubConstraints}$ by signing at least the publisher constraints included with the publisher content message using the cryptographic identity $y_{Pub}$ of the publisher device 80. In at least one embodiment, a signature of the publisher constraints $\sigma_{PubConstraints}$ is generated for each location in the requested publisher media content at which an advertisement can or should be served. As will be discussed in greater detail below, consumer devices 60 can use the signature(s) of the publisher constraints $\sigma_{PubConstraints}$ to generate proofs of ad selection that prove that a selected and served advertisements satisfies any constraints of the advertiser and of the publisher.

Once the consumer device 60 receives the publisher content message, which includes the content mapping key $y_{Map}$ and any publisher constraints, the method 500 continues with two distinct processes. On one hand, the method 500 continues with a process for generating a proof of interest based on the interaction between the consumer device 60 and the publisher device 80 (blocks 508-516). Other the other hand, the method 500 continues with a process for selecting and serving an advertisement in conjunction with the request publisher media content (blocks 518-524). In practice, the process for selecting and serving an advertisement is performed immediately to provide a more seamless user experience, and the process for generating a proof of interest can advantageously performed at a later time. However, the process for generating a proof of interest is described first below.

With continued reference to FIG. 5, the process for generating a proof of interest in the method 500 begins with steps of constructing, with the consumer device, a proof of interaction message using the received content mapping key under a blind signature algorithm (block 508) and sending, with the consumer device, a blind signature message to the publisher device (block 510). Particularly, the proof of interest that is to be generated takes the form of a signature by the publisher device 80 of a proof of interaction message m. The processor 62 constructs the proof of interaction message m. As used herein, a "proof of interest" or "proof of interaction" is a signature under a cryptographic identity of a first device (e.g., a publisher device 80) of data at least including a cryptographic identity of a second device (e.g., a consumer device 60). In this way, the signature by the first device (e.g., the publisher device 80) acts as an assertion that the second device (e.g., the consumer device 60) did in fact interact with the first device (e.g., the publisher device 80). Preferably, the particular cryptographic identity (e.g., content mapping key $y_{Map}$) of the first device (e.g., the publisher device 80) under which the signature is signed is associated with a particular classifier or group of classifiers indicating a particular quality or nature of the interaction between the devices (e.g., a category classification of the requested media content).

In at least one embodiment, the processor 62 constructs the proof of interaction message m as a concatenation of the latest ephemeral cryptographic identity $y_{Eph_n}$ of the consumer device 60 with the content mapping key $y_{Map}$ provided by the publisher device 80 with respect to the requested publisher media content (i.e., $m = y_{Eph_n} \| y_{Map}$). In an alternative embodiment, the processor 62 constructs the proof of interaction message m as a concatenation of the content mapping key $y_{Map}$ provided by the publisher device 80 with respect to the requested publisher media content, with a list of public keys $\{y_1, \ldots, y_j\}$ (i.e., $m = y_{Map} \| \{y_1, \ldots, y_j\}$). The list of public keys $\{y_1, \ldots, y_j\}$ is randomly selected by the controlling watchtower 50 of the consumer device 60 and defines a ring of valid ephemeral cryptographic identities $y_{Eph}$ of agent under the control of the controlling watchtower 50, which includes the latest ephemeral cryptographic identity $y_{Eph_n}$ of the particular consumer device 60. Additionally, the set list of public keys $\{y_1, \ldots, y_j\}$ also includes a ring key. The processor 62 calculates the ring key by mapping a hash of the most recent verifiable random value ξ from the decentralized random beacon 40 to a point on an elliptic curve, using a hash to curve function. The resulting point on the elliptic curve is utilized as ring key. In at least one embodiment, the processor 50 of the controller watchtower 50 randomly selects a subset of valid ephemeral cryptographic identities $y_{Eph}$, including that of the particular consumer device 60, under the control of the controlling watchtower 50 to be included in the list of public keys $\{y_1, \ldots, y_j\}$ and operates the communication module 56 to transmit a signing ring message, which includes the list of public keys $\{y_1, \ldots, y_j\}$ to the consumer device 60.

In order to maintain the privacy of the consumer device 60 and, thus, the consumer, the proof of interaction message m is signed by the publisher device under a blind signature scheme using pairing friendly elliptic curves. Particularly, it will be appreciated that a blind signature scheme enables a user to obtain a signature from a third party on a message without revealing the message to the signing party. In at least one embodiment, the following blind signature scheme is used. This blind signature scheme works in Gap Diffie Hellman groups, which are groups where the Decisional Diffie Hellman problem is easy but the computational version remains hard. Thus, this blind signature scheme operates under type 3 pairing friendly elliptic curve groups.

In at least one embodiment, the processor 62 of the consumer device 60 utilizes a blind signature scheme according to the following procedure to collect a proof of interest using the constructed proof of interaction message m. First, for the purpose of the blind signature scheme, let $G \times G \to G_T$ be a pairing where G, $G_T$ are finite cyclic groups of prime order p, where g is a generator in G. Additionally, let $H: \{0,1\}^* \to G$ be a cryptographic hash function. The processor 62 selects a random private key $r \in_R \mathbb{Z}^*_p$ and calculates a blinded message h' as $h' = H(m)g^r$, where $g^r$ operates as a random public key corresponding to the random private key r. The processor 62 operates the communication module 66 to transmit a blind signature message to the publisher device 80, which includes the blinded message h'. In at least one embodiment, the blind signature message includes a message signature under the latest ephemeral cryptographic identity $y_{Eph_n}$ of the consumer device 60, generated by the processor 62 with the corresponding private key $x_{Eph_n}$.

The process for generating a proof of interest in the method 500 continues with steps of receiving, with the publisher device, the blind signature message from the consumer device (block 512), signing, with the publisher device, the blind signature message (block 514), and returning, with the publisher device, the signed message to the consumer device (block 516). Particularly, in response to receiving the blind signature message from the consumer device 60, the processor 82 of the publisher device 80 calculates a BLS-type blind signature $\sigma' = h'^{x_{Map}}$ of the blinded message h' using the private key $x_{Map} \in \mathbb{Z}_p^*$ that corresponds the content mapping key $y_{Map}$ provided in the publisher content message, where $y_{Map} = g^{x_{Map}}$, which is registered with the list of publisher content mapping keys 220 on the advertising blockchain $BC_{AD}$. The processor 82 then operates the communication module 86 to transmit a blind signature response message to the consumer device 60, which has the blind signature $\sigma'$. In at least one embodiment, the blind signature response message includes a message signature under the cryptographic identity $y_{Pub}$ of the publisher device 80, generated by the processor 82 with the corresponding private key $x_{Pub}$.

In response to receiving the blind signature response message from the publisher device, the processor 62 of the consumer device 60 determines an unblinded signature σ as $\sigma = \sigma' y_{Map}^{-r}$, where $y_{Map} = g^{x_{Map}}$. It will be appreciated that the random value r, which only the consumer device 60 has knowledge of, can be factored out to arrive at $\sigma = H(m)^{x_{Map}}$, which is the signature of H(m) using the private key $x_{Map}$ that corresponds the content mapping key $y_{Map}$ provided in the publisher content message. In one embodiment, the processor 62 verifies the unblinded signature a using the content mapping key $y_{Map}$ provided in the publisher content message (i.e., by checking that $e(H(m), y_{Map}) = e(\sigma, g)$).

The unblinded signature σ can be used by the consumer device as a proof of interest and will be also referred to herein as a proof of interest σ, which proves that the consumer device 60 requested and, thus, is interested in the requested publisher media content categorized under the classifier or group of classifiers to which the the content mapping key $y_{Map}$ corresponds. It will be appreciated that the usage of the blind signature scheme in collecting the proof of interest σ acts as a mechanism to make cross-site tracking more difficult, while still allowing a consumer device 60 to obtain a proof of interaction that is unique to and can only be used by the particular consumer device 60.

Over time, as the consumer interacts with media content provided by a variety of publishers, the consumer device 60 collects numerous proofs of interest σ that prove interest in a variety of publisher media contents. Each proof of interest σ is unique to ephemeral cryptographic identity $y_{Eph_n}$ or $y_{Eph_{n-1}}$ under which it was collected and can only be used while the ephemeral cryptographic identity $y_{Eph_n}$ or $y_{Eph_{n-1}}$ remains valid.

Thus, the ephemeral identity rotation process, described above with respect to the method 300 illustrated in FIG. 4, operates to cause eventual expiration of the proofs of interest a collected by the consumer device 60. However, while valid, the proofs of interest σ can be used to select advertisements to be served in conjunction with publisher media content, according to the process described below.

With continued reference to FIG. 5, the process for selecting and serving an advertisement in the method 500 begins with a step of selecting an advertisement to be served in conjunction with the requested publisher media content from the list of matching advertisements (block 518). Particularly, as noted above, the memory 64 of the consumer device 60 stores a list of matching advertisements, which includes advertisements for which the consumer fits within the target audience, as defined by the associated targeting models for the advertisements. In response to receiving the publisher content message, which includes the content mapping key $y_{Map}$ and any publisher constraints, the processor 62 of the consumer device 60 selects an advertisement from the list of matching advertisements to be served at each location in the requested publisher media content at which an advertisement can served.

In order to select each advertisement, the processor 62 checks the compatibility of the publisher constraints for the particular location in the requested publisher media content with the respective advertiser constraints for each. In each case, the processor 62 checks that the classifiers to which the content mapping key $y_{Map}$ corresponds are within a set of classifiers identifying the acceptable categories of publisher media content that the advertisement is allowed to be presented in conjunction with (or not within a set of unacceptable classifiers). In each case, the processor 62 checks that the set of classifiers that define a categorization of the advertisement media are within the set of classifiers identifying the acceptable categories of advertisement media content that is allowed to be presented in conjunction with the requested publisher media content (or not within a set of unacceptable classifiers). In each case, the processor 62 checks that the minimum amount the publisher is willing to accept for an advertising impression at the respective location is less than the maximum amount that the advertiser is willing to pay to for an impression of the advertisements. In each case, the processor 62 checks that the advertiser is not in an advertiser blacklist (or is within an advertiser whitelist) from the publisher constraints. In each case, the processor 62 checks that the publisher is not in a publisher blacklist (or is within a publisher whitelist) from the advertiser constraints.

Once an advertisement has been selected for a particular location in the requested publisher media content, the process for selecting and serving an advertisement in the method 500 continues with a step of retrieving advertisement media content and inserting the advertisement media content into the context of the publisher media content (block 520). Particularly, if the selected advertisement media content was not proactively retrieved ahead of time, the processor 62 operates the communication module 66 retrieve the advertisement media content according to retrieval instructions and/or information, such as a URL, stored on in the ad campaign data 216 on the advertising blockchain $BC_{Ad}$. Once retrieved, the processor 62 inserts the selected advertisement media content into the publisher media content at the appropriate location or in the appropriate manner identified by the publisher. This insertion may, for example, comprise operating, with the processor 62, a display or speaker of the user interface 68 of the consumer device 60 to show or play the advertisement media content in conjunction with the publisher media content at the appropriate location or in the appropriate manner identified by the publisher. It will be appreciated that this insertion of the advertisement media content comprises the advertisement impression for which the publisher can be paid by the advertiser.

The process for selecting and serving an advertisement in the method 500 continues with a step of monitoring, with the consumer device, the advertisement media content for consumer interaction events (block 522). Particularly, the processor 62 of the consumer device monitors whether the consumer interacts with the advertisement media content, such as clicking on the advertisement media content. In some cases, in response to a consumer interaction with the advertisement media content, such as clicking, the processor 62 performs some action defined by the ad campaign data 216, such as displaying a webpage relating the advertisement. Additionally, a proof of this interaction with the advertisement media content may be stored in the private consumer data 67 and used for testing targeting models. In one embodiment, the consumer device 60 collects a proof of interaction with the advertisement by exchanging messages with the advertiser device 80 in a similar process to what was described above for collecting a proof of interaction with publisher media content.

The process for selecting and serving an advertisement in the method 500 continues with a step of computing, with the consumer device, proofs of ad targeting and ad selection and sending an ad selection message to the controlling watchtower (block 524). Particularly, once an advertisement has been selected for a particular location in the requested publisher media content, the processor 62 of the consumer device 60 generates a proof of ad targeting and a proof of ad selection. However, these proofs needn't be generated immediately and can be generated at some time in the near future.

In order to construct a proof of ad targeting, the processor 62 of the consumer device 60 identifies a set of proofs of interest σ stored in the private consumer data 67, which prove that that the consumer fits within the targeting model for the advertisement that was presented to the consumer. In other words, the processor 62 of the consumer device 60 identifies a set of proofs of interest σ that where collected under content mapping keys $y_{Map}$ correspond to classifiers or groups of classifiers that fit within the targeting model and, in particular, make the respective query string true (or sufficiently confident, in the case that the query string outputs a confidence metric).

Once a set of proofs of interest σ are identified, the processor 62 aggregates the set of proofs of interest σ into an aggregated signature $\sigma_{Targeting}$, which will be utilized as and referred to herein as the proof of ad targeting $\sigma_{Targeting}$. As a reminder, the proofs of interest σ are signatures of proof of interaction messages m, which are a concatenation information at least including the content mapping key $y_{Map}$ and an valid ephemeral cryptographic identity $y_{Eph}$ of the consumer device 60. Thus, the proof of interaction messages m are each unique, but also include as a common element the valid ephemeral cryptographic identity $y_{Eph}$ (or a ring of keys that includes the valid ephemeral cryptographic identity $y_{Eph}$). Thus, a compact aggregated signature $\sigma_{Targeting}$ can be generate to advantageously minimize a required amount of data for communication protocols. As used herein, a "proof of ad targeting" refers to a collection or aggregation of data (e.g., a collection or aggregation of proofs of interest) that satisfy a targeting model for an advertisement (e.g., cause a query string to output true result or output a confidence metric that exceeds threshold value).

In at least one embodiment, the processor 62 generates the proof of ad targeting $\sigma_{Targeting}$ according to the following signature aggregation algorithm. First, for the purpose of the signature aggregation algorithm, let $e: G_1 \times G_2 \to G_T$ be a bilinear map where $G_1$, $G_2$, $G_T$ are finite cyclic groups of prime order p, where $g_1$, $g_2$ are generators in $G_1$, $G_2$, respectively. Let ψ be a computable isomorphism from $G_2$ to $G_1$. Let $H:\{0,1\}^* \to G_1$ be a full domain cryptographic hash function, which may be treated as a random oracle. Let messages $M_i \in \{0,1\}^*$ be the set of distinct proof of interaction messages m that were signed to provide the identified set of proofs of interest σ. Let signatures $\sigma_i \in G_1$ be the identified set of proofs of interest σ that is to be aggregated. Finally, let public keys $v_i \in G_2$ be the set of content mapping keys $y_{Map}$ under which the proofs of interest σ were signed.

The processor 62 generates the proof of ad targeting $\sigma_{Targeting}$ by calculating:

$$\sigma_{Targeting} \leftarrow \prod_{i=1}^{k} \sigma_i$$

where k is the number of individual proofs of interest σ in the identified set of proofs of interest $\sigma_i$ that is to be aggregated. It should be noted that the aggregate signature $\sigma_{Targeting}$ has a length equal to only one proof of interest σ. Additionally, it will be appreciated that, given this aggregate signature, a list of the messages $M_i \in \{0,1\}^*$ (i.e., the proof of interaction messages m), and a list of signer public keys $v_i \in G_2$ (i.e., the set of content mapping keys $y_{Map}$ under which the proofs of interest σ were signed) a verifier can be convinced that each publisher signed their corresponding message.

Once the proof of ad targeting $\sigma_{Targeting}$ is generated, the processor collects the additional information needed to form the proof of ad selection. Particularly, as noted above, a signature of the advertiser constraints $\sigma_{AdConstraints}$ for each advertisement of the ad campaign written to the ad campaign data 216 on the advertising blockchain $BC_{Ad}$. Additionally, as noted above, the publisher content message includes a signature of the publisher constraints $\sigma_{PubConstraints}$ for each location in the requested publisher media content at which an advertisement can be served. The signature of the advertiser constraints $\sigma_{AdConstraints}$ and the signature of the publisher constraints $\sigma_{PubConstraints}$ are used to provide a proof of ad selection. In other words, the proof of ad selection is the set of signatures $\sigma_{AdConstraints}$ and $\sigma_{PubConstraints}$, which authenticates the particular advertiser constraints and publisher constraints that where applied during the ad selection. In some cases, the proof of ad targeting $\sigma_{Targeting}$ can also be considered part of the proof of ad selection, in addition to the signatures $\sigma_{AdConstraints}$ and $\sigma_{PubConstraints}$.

Once the proofs of ad targeting and ad selection are formed, the processor 62 operates the communication module 66 to transmit an ad selection message to the controlling watchtower 50. The ad selection message at least includes the proof of ad targeting $\sigma_{Targeting}$ and the information needed to validate the proof of ad targeting $\sigma_{Targeting}$, in particular the proof of interaction messages m used to generate the proofs of interest σ, and the set of content mapping keys $y_{Map}$ under which the proofs of interest a were signed. In some embodiments, the set of content mapping keys $y_{Map}$ can be omitted from the ad selection message, since the controlling watchtower 50 can extract the set of content mapping keys $y_{Map}$ from the proof of interaction messages m. Additionally, the ad selection message at least includes the signature of the advertiser constraints $\sigma_{AdConstraints}$ and the signature of the publisher constraints $\sigma_{PubConstraints}$ which form the proof of ad selection. Additionally, the ad selection message includes the details of the publisher constraints and advertiser constraints themselves, for the purpose of verification of the proof of ad selection. In some embodiments, the advertiser constraints $\sigma_{AdConstraints}$ and the advertiser constraints can be omitted, since the controlling watchtower 50 can retrieve this signature of the advertiser constraints $\sigma_{AdConstraints}$ and the advertiser constraints from the ad campaign data 216 on the advertising blockchain $BC_{Ad}$. The ad selection message may further include the ad campaign ID corresponding to the advertisement that was served. The ad selection message may further include a timestamp and/or the most recent verifiable random value ξ from the decentralized random beacon 40. The ad selection message may include the certificate Cert corresponding to the ephemeral cryptographic identity $y_{Eph}$ under which the proofs of interest σ where collected.

Finally, the ad selection message includes a message signature, signed by the processor 62 using a recoverable signature algorithm such as a recoverable ECDSA variant, under the ephemeral cryptographic identity $y_{Eph}$ under which the proofs of interest σ where collected. Alternatively, the processor 62 signs the ad selection message under a traceable ring signature with the ring restricted to be the same as the ring under which all proofs of interest have been issued, if a ring signature variant is being used for the proof of interaction messages m. In the event that a traceable ring signature scheme allows a controlling watchtower to reveal a signer, the certificate Cert can be omitted from the ad selection message.

It will be appreciated that, for each location in the requested publisher media content at which an advertisement is served, the consumer device 60 constructs respective proofs of ad targeting and ad selection. Likewise, the consumer device 60 transmits a respective ad selection message to the controlling watchtower 50 for each for each location in the requested publisher media content at which an advertisement is served.

Watchtower Oversight and Validation of Advertisement Impressions

Figure 7:
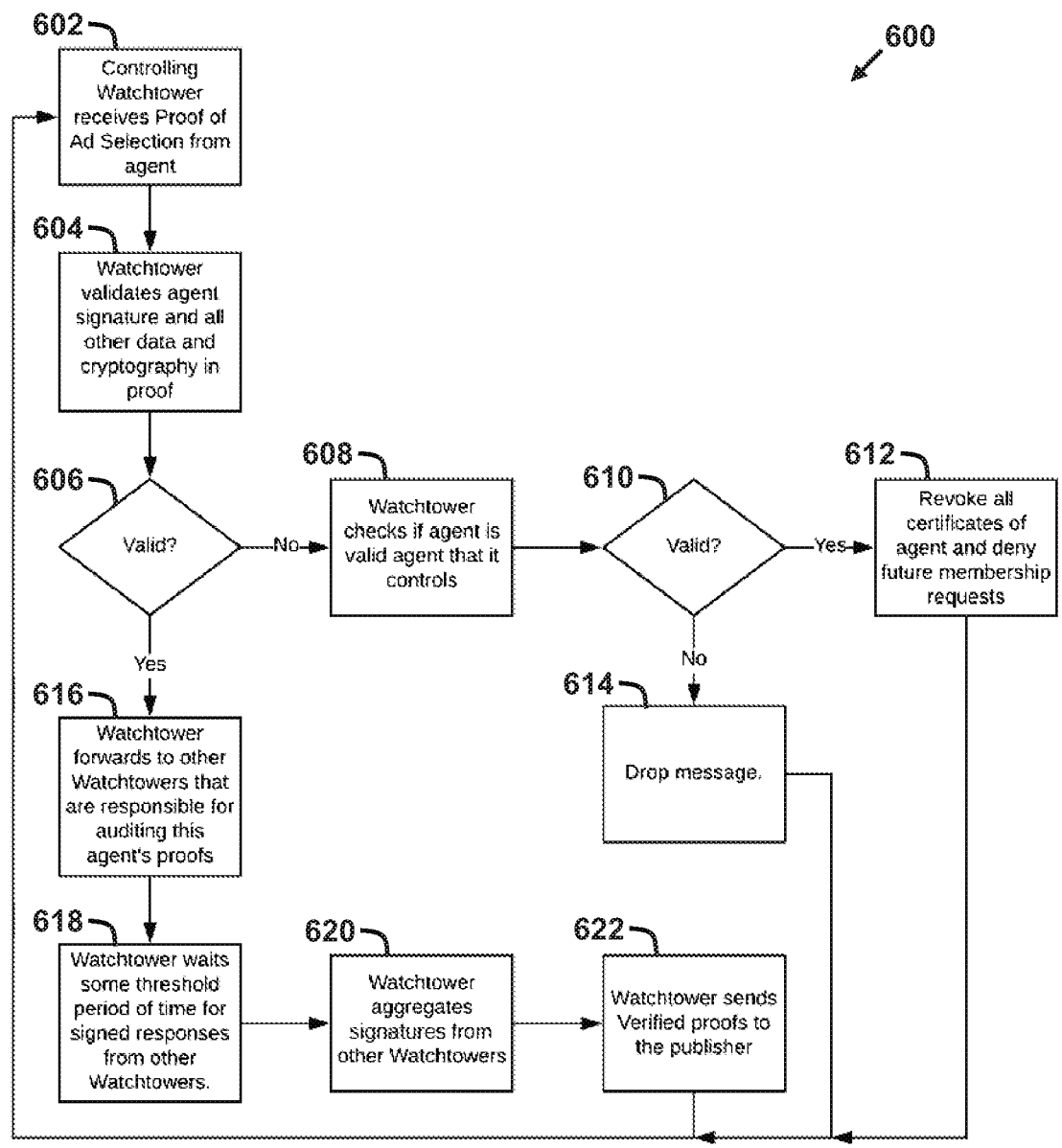
FIG. 7 shows a method for validating proofs of ad targeting and ad selection received from a consumer device to provide a proof of attention.

FIG. 7 shows a method 600 for validating proofs of ad targeting and ad selection received from a consumer device to provide a proof of attention. Each ad selection message is validated by the controlling watchtower 50 and a subset of additional watchtowers 50 to generate a proof of attention. The proof of attention is provided to the publisher and can be used to prove that a valid advertisement impression was provided and received credit and/or payment from the advertiser for the advertisement impression.

The method 600 begins with steps of receiving, with the controlling watchtower, an ad selection message from a consumer device (block 602), verifying, with the controlling watchtower, the ad selection message signature and the proofs of ad targeting and ad selection contained within (block 604), and checking whether the advertisement impression was completely valid (block 606). Particularly, in response to receiving an ad selection message from a consumer device, the processor 52 of the controlling watchtower 50 verifies or validates at least the message signature, the proof of ad targeting $\sigma_{Targeting}$, and the proof of ad selection [$\sigma_{AdConstraints}$, $\sigma_{PubConstraints}$], as well as any other data that can or should be validated.

In order to verify the message signature of the ad selection message, the processor 52 verifies the message signature (or linkable ring signature) of the ad selection message using the ephemeral cryptographic identity $y_{Eph}$ (or list of public keys defining a signing ring) under which message signature was signed.

In order to verify the proof of ad targeting $\sigma_{Targeting}$ of the ad selection message, the processor 52 calculates a hash $h_i \leftarrow H(M_i)$ of each proof of interaction message m in the list of the messages $M_i$ (i.e., for 1≤i≤k). Next, the processor 52 checks if the following holds true:

$$e(\sigma_{Targeting}, g_2) = \prod_{i=1}^{k} e(h_i, v_i)$$

If so, then the proof of ad targeting $\sigma_{Targeting}$ is validly constructed. Next, the processor 52 operates the communication module 56 to retrieve, from the list of publisher content mapping keys 220 on the advertising blockchain $BC_{Ad}$, the classifiers or groups of classifiers corresponding to the set of content mapping keys $y_{Map}$, which can be extracted from the proof of interaction messages m or were included in the ad selection message. The processor 52 operates the communication module 56 to retrieve, from the ad campaign data 216 on the advertising blockchain $BC_{Ad}$, the targeting model of the served advertisement, based on the ad campaign ID included in the ad selection message. The processor 52 applies the targeting model to the classifiers or groups of classifiers corresponding to the set of content mapping keys $y_{Map}$, to determine if the consumer fits within the target audience for the advertisement and/or ad campaign.

In order to verify the proof of ad selection [$\sigma_{AdConstraints}$, $\sigma_{PubConstraints}$] of the ad selection message, the processor 52 verifies the signatures $\sigma_{AdConstraints}$, $\sigma_{PubConstraints}$ using the respective cryptographic identities $y_{Ad}$ and $y_{Pub}$, respectively, to ensure that the publisher constraints and advertisement constraints are authentic. Additionally, the processor 52 checks the compatibility of the publisher constraints with the advertiser constraints for the advertisement that was served. Particularly, the processor 52 checks that the classifiers to which the content mapping key $y_{Map}$ corresponds are within a set of classifiers identifying the acceptable categories of publisher media content that the advertisement is allowed to be presented in conjunction with (or not within a set of unacceptable classifiers). The processor 52 checks that the set of classifiers that define a categorization of the advertisement media are within the set of classifiers identifying the acceptable categories of advertisement media content that is allowed to be presented in conjunction with the requested publisher media content (or not within a set of unacceptable classifiers). The processor 52 checks that the minimum amount the publisher is willing to accept for an advertising impression at the respective location is less than the maximum amount that the advertiser is willing to pay to for an impression of the advertisements. The processor 52 checks that the advertiser is not in an advertiser blacklist (or is within an advertiser whitelist) from the publisher constraints. The processor 52 checks that the publisher is not in a publisher blacklist (or is within a publisher whitelist) from the advertiser constraints.

Finally, the processor 52 checks if the consumer device 60 has exceeded a predefined rate limit for advertisement impressions. Particularly, in at least one embodiment, a rate limiting algorithm is utilized, which is agreed upon by participants in the system 10, that defines a hard upper bound on the number of advertisement impressions that may be served to the same consumer device 60 in any given interval of time. In one embodiment, the rate limiting algorithm is configured to accommodate the average duration of user interaction, the length of advertising media, and other factors as deemed necessary by the industry. The processor 52 checks whether a number of ad selection messages received by the particular consumer device 60 exceeds a predefined rate limit for advertisement impressions for a particular interval of time.

If the message signature, the proof of ad targeting $\sigma_{Targeting}$, and the proof of ad selection [$\sigma_{AdConstraints}$, $\sigma_{PubConstraints}$] are all determined to be valid and the consumer device 60 has not exceeded the predefined rate limit for advertisement impressions for the particular interval of time, then the advertisement impression is considered to be valid. If the advertisement impression is determined to be valid, then the processor 52 generates a proof of attention $\sigma_{Attention}$ as a signature of the ad selection message, or some portion thereof, received from the consumer device 60 concatenated with its own cryptographic identity $y_W$, in a similar manner as discussed above for collecting the proofs of interest $\sigma$. In other words, the processor 52 generates a signature $\sigma_{Attention}$ of a proof of attention message $m_{Attention}$ using its private key $x_W$, where the proof of attention message $m_{Attention}$ includes a concatenation of its own cryptographic identity $y_W$ with some portion of the ad selection message. The concatenation with the cryptographic identity $y_W$ operates to make the proof of attention message $m_{Attention}$ unique to the controlling watchtower 50. For example, the proof of attention message $m_{Attention}$ may comprise a concatenation of $\sigma_{Targeting}$, $\sigma_{AdConstraints}$, $\sigma_{PubConstraints}$, and the cryptographic identity $y_W$ of the controlling watchtower. This proof of attention $\sigma_{Attention}$ acts as proof that the controlling watchtower 50 has validated the particular advertisement impression corresponding the particular ad selection message.

If the advertisement impression is not valid, the method 600 continues with steps of checking, with the controlling watchtower, whether the consumer device is valid and under the control of the controlling watchtower (blocks 608 and 610). Particularly, the processor 52 of the controlling watchtower checks whether the ephemeral cryptographic identity $y_{Eph}$ (or list of public keys defining a signing ring) under which message signature of the invalid ad selection message was signed is associated with a consumer device 60 under the control of the controlling watchtower 50. In one embodiment, the processor 52 checks if the the ephemeral cryptographic identity $y_{Eph}$ is associated with its own cryptographic identity $y_W$ in the list of ephemeral identities 212. Alternately, the processor 52 checks an internal registry stored on the memory 54 of the controlling watchtower 50 determine the consumer device 60 under the control of the controlling watchtower 50.

The method 600 continues with steps of, if the consumer device is valid and under the control of the controlling watchtower, then revoking all certificates of the consumer devices and denying any future membership requests (block 612) and, otherwise, dropping the ad selection message (block 614). Particularly, if the ephemeral cryptographic identity $y_{Eph}$ under which message signature of the invalid ad selection message was signed is under the control of the controlling watchtower 50, then the processor 52 operates the communication module 56 to transact with the identity registry smart contract 202 to revoke the certificates $Cert_n$ and $Cert_{n-1}$ that the controlling watchtower 50 knows to be associated with the particular consumer device 60 and to revoke the long-term cryptographic identity $y_{Ag}$ of the particular consumer device 60. Otherwise, if invalid ad selection message was signed under an ephemeral cryptographic identity $y_{Eph}$ that is not under the control of the controlling watchtower 50, the message is simply dropped and/or ignored. Alternatively, in the case that the ephemeral cryptographic identity $y_{Eph}$ is associated with a cryptographic identity $y_W$ of another watchtower 50, the processor 52 operates the communication module 56 to transmit a message to the other watchtower 50 notifying it that an invalid ad selection message was received.

Figure 8:
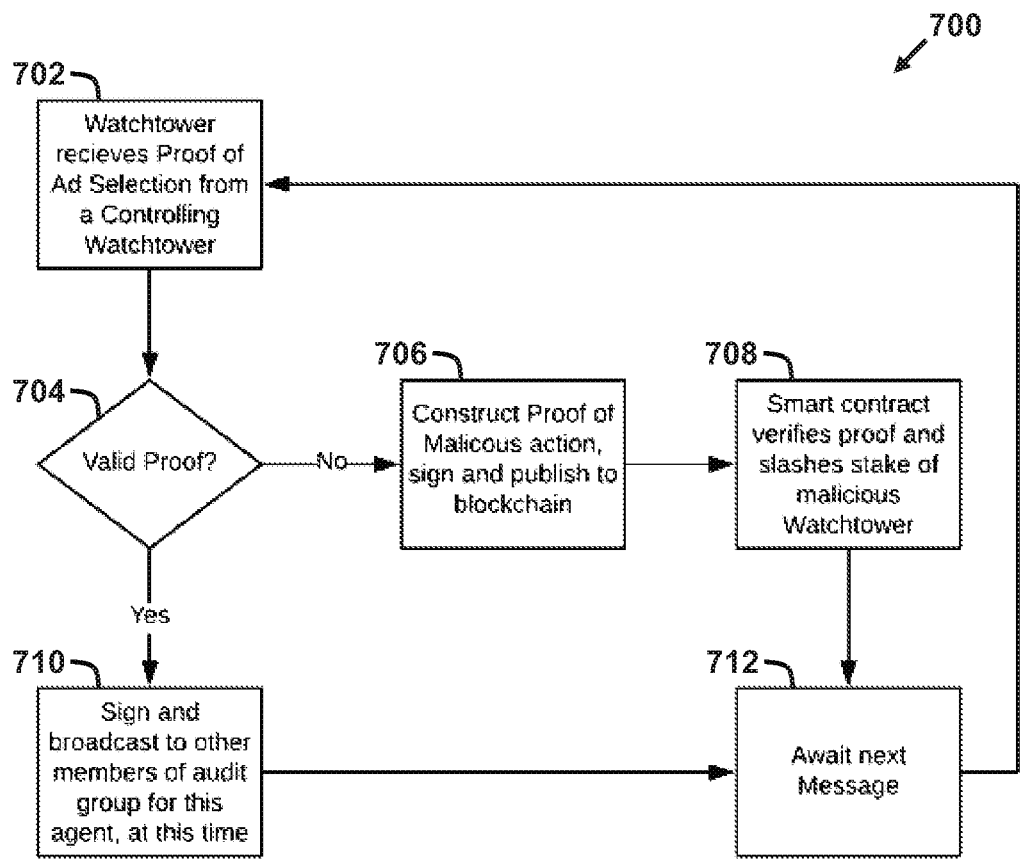
FIG. 8 shows method for auditing controlling watchtower validations with further watchtowers.

If the advertisement impression is valid, the method 600 continues with a step of forwarding, with the controlling watchtower, the proof of attention to other watchtowers in a designated subset of auditing watchtowers (blocks 616). Particularly, the processor 52 of the controlling watchtower 50 operates the communication module 56 to transmit and/or forward the ad selection that was received from the consumer device 60 to other watchtowers 50 a designated subset of auditing watchtowers 50. In at least one embodiment, the proof of attention $\sigma_{Attention}$ generated by the controlling watchtower 50 is also forwarded with the ad selection message. In at least one embodiment, the processor 52 determines which other watchtowers are in the designated subset of auditing watchtowers 50 in a deterministic manner based on the most recent verifiable random value $\xi$ from the decentralized random beacon 40. The algorithm for determining the designated subset of auditing watchtowers 50 is such that the controlling watchtower 50 with respect to an ad selection message is always a member of the designated subset of auditing watchtowers 50. Additionally, the algorithm for determining the designated subset of auditing watchtowers 50 is such that the designated subset of auditing watchtowers 50 changes at regular intervals and any observer of the advertising blockchain $BC_{Ad}$ will agree on the outcome of this determination FIG. 8 shows method 700 of auditing controlling watchtower validations with further watchtowers. Particularly, after the controlling watchtower 50 for a particular ad selection message validates the advertisement impression, the other members of the designated subset of auditing watchtowers 50 also check to see if the advertisement is valid and, if so, signs a respective proof of attention for the advertisement impression.

The method 700 begins with steps of receiving, with an auditing watchtower, a forwarded ad selection message from a controlling watchtower (block 702) and checking whether the advertisement impression is valid (block 704). Particularly, the processor 52 of the auditing watchtower 50 verifies or validates at least the message signature, the proof of ad targeting $\sigma_{Targeting}$, and the proof of ad selection [$\sigma_{AdConstraints}$, $\sigma_{PubConstraints}$], as well as any other data that can or should be validated, according to all of the same processes discussed above with respect to the controlling watchtower 50. If the message signature, the proof of ad targeting $\sigma_{Targeting}$, and the proof of ad selection a [$\sigma_{AdConstraints}$, $\sigma_{PubConstraints}$] are all determined to be valid and the consumer device 60 has not exceeded the predefined rate limit for advertisement impressions for the particular interval of time, then the advertisement impression is considered to be valid.

If the advertisement impression is not valid, the method 700 continues with steps of constructing, with the auditing watchtower, a proof of malicious action and publishing it to a smart contract on the advertising blockchain (block 706) and, with the smart contract, verifying the proof of malicious action and slashing a stake of the controlling watchtower (block 708). Particularly, if the advertisement impression is determined to be invalid by the auditing watchtower, the processor 52 of the auditing watchtower constructs a proof of malicious action. This proof of malicious action may, for example, simply comprise the forwarded ad selection message and the proof of attention $\sigma_{Attention}$ generated by the controlling watchtower 50. The processor 52 of the auditing watchtower operates the communication module 56 to transmit the proof of malicious action to a smart contract on the advertising blockchain $BC_{Ad}$. In at least one embodiment, this smart contract is the identity registry smart contract 202.

In response to receiving the proof of malicious action, the processor 52 of one or more watchtowers 50 execute instructions of the smart contract, such as the identity registry smart contract 202, to confirm that (i) the advertisement impression was invalid using the same processes described above and (ii) the controlling watchtower 50 nevertheless signed the proof of attention $\sigma_{Attention}$ by verifying the signature using the cryptographic identity $y_W$ of the controlling watchtower 50. If so, the processor 52 of one or more watchtowers 50 execute instructions of the smart contract to subtract a portion of the fee or stake that has been deposited by the controlling watchtower 50 to register itself and/or its controlled consumers devices 60. In one embodiment, subtracted portion of the fee or stake may be rewarded to the auditing watchtower 50 who constructed the proof of malicious action.

If the advertisement impression is valid, the method 700 continues with steps of signing a proof of attention and broadcasting the proof of attention to the other watchtowers of the designated subset of watchtowers (block 710) and awaiting further ad selection messages (block 712). Particularly, if the advertisement impression is determined to be valid, then the processor 52 of the auditing watchtower 50 generates a proof of attention $\sigma_{Attention}$ as a signature of the ad selection message, or some portion thereof, received from the consumer device 60 concatenated with its own cryptographic identity $y_W$, in a similar manner as discussed above for collecting the proofs of interest $\sigma$. In other words, the processor 52 generates a signature $\sigma_{Attention}$ of a proof of attention message $m_{Attention}$ using its private key $x_W$, where the proof of attention message $m_{Attention}$ includes a concatenation of its own cryptographic identity $y_W$ with some portion of the ad selection message. The concatenation with the cryptographic identity $y_W$ operates to make the proof of attention message $m_{Attention}$ unique to the particular auditing watchtower 50. For example, the proof of attention message $m_{Attention}$ may comprise a concatenation of $\sigma_{Targeting}$, $\sigma_{AdConstraints}$, $\sigma_{PubConstraints}$, and the cryptographic identity $y_W$ of the controlling watchtower. This proof of attention $\sigma_{Attention}$ acts as proof that the auditing watchtower 50 has validated the particular advertisement impression corresponding the particular ad selection message.

Once the proof of attention $\sigma_{Attention}$ is generated, the processor 52 of the auditing watchtower 50 operates the communication module 56 to broadcast the proof of attention $\sigma_{Attention}$, and possibly the respective proof of attention message $m_{Attention}$, to other watchtowers 50 in the designated subset of watchtowers 50, which at least includes the controlling watchtower 50.

Returning to FIG. 7, the method 600 continues with a step of waiting a threshold amount of time to receive proofs of attention from the other watchtowers in the designated subset of watchtowers (block 618). Particularly, the processor 52 of the controlling watchtower waits a predetermined amount of time to receive proofs of attention $\sigma_{Attention}$, and possibly the respective proof of attention messages $m_{Attention}$, from the other watchtowers 50 in designated the subset of watchtowers 50.

After the threshold amount of time, the method 600 continues with a step of aggregating the proofs of attention to generated an aggregated proof of attention (block 620). If a threshold amount of proofs of attention $\sigma_{Attention}$ are received within the threshold amount of time, the processor 52 of the controlling watchtower 50 calculates an aggregated proof of attention $\sigma_{AggregatedAttention^*}$ based on the proofs of attention $\sigma_{Attention}$ determined by the controlling watchtower 50 and the other watchtowers 50 in the designated subset of watchtowers 50. In at least one embodiment, the processor 52 aggregates the proofs of attention $\sigma_{Attention}$ according to the same signature aggregation algorithm used above to determine the proof of ad targeting $\sigma_{Targeting}$. However, in this case, let messages $M_i \in \{0,1\}^*$ be the set of distinct proof of attention messages $m_{Attention}$ that were signed to provide the proofs of attention $\sigma_{Attention}$. Let signatures $\sigma_{Attention_i} \in G_1$ be the set of the proofs of attention $\sigma_{Attention}$ that are to be aggregated. Finally, let public keys $v_i \in G_2$ be the set of cryptographic identities $y_W$ under which the proofs of attention $\sigma_{Attention}$ were signed.

The processor 52 generates the aggregated proof of attention $\sigma_{AggregatedAttention^*}$ by calculating:

$$\sigma_{AggregatedAttention} \leftarrow \prod_{i=1}^{k} \sigma_{Attention_i}$$

where k is the number of individual proofs of attention $\sigma_{Attention}$ that were received by the controlling watchtower 50. It should be noted that the aggregate signature $\sigma_{AggregatedAttention^*}$ has a length equal to only one proof of attention $\sigma_{Attention}$. Additionally, it will be appreciated that, given this aggregate signature, a list of the messages $M_i \in \{0,1\}^*$ (i.e., the proof of attention messages $m_{Attention}$), and a list of signer public keys $v_i \in G_2$ (i.e., the set of cryptographic identities $y_W$ under which the proofs of attention $\sigma_{Attention}$ were signed) a verifier can be convinced that each watchtower signed their corresponding message.

Finally, the method 600 continues with a step of sending, with the controlling watchtower, the aggregated proof of attention to the publisher device (block 622). Particularly, the processor 52 of the controlling watchtower 50 operates the communication module 56 to transmit an advertisement impression proof message to the publisher device 80, which includes the aggregated proof of attention $\sigma_{AggregatedAttention^*}$. In one embodiment, the advertisement impression proof message includes the ad campaign ID for the advertisement that was served. In one embodiment, the advertisement impression proof message further includes information regarding consumer interactions with the advertisement. In at least one embodiment, the controlling watchtower 50 transmits the advertisement impression proof message at some later point after a predetermined delay time period has elapsed. It will be appreciated that, this delay acts as a means of anonymization on behalf of the consumer device 60.

Additionally, in one embodiment the processor 52 of the controlling watchtower 50 operates the communication module 56 to transmit a further advertisement impression proof message to the advertiser device 70. The further advertisement impression proof message includes the aggregated proof of attention $\sigma_{AggregatedAttention^*}$. In some embodiments, the further advertisement impression proof message includes also includes, for the purpose of verifying the aggregated proof of attention $\sigma_{AggregatedAttention^*}$, the list of the messages $M_i \in \{0,1\}^*$ (i.e., the proof of attention messages $m_{Attention}$), and the list of signer public keys $v_i \in G_2$ (i.e., the set of cryptographic identities $y_w$ under which the proofs of attention $\sigma_{Attention}$ were signed). In one embodiment, the advertisement impression proof message includes the ad campaign ID for the advertisement that was served. In one embodiment, the further advertisement impression proof message further includes information regarding consumer interactions with the advertisement. In at least one embodiment, the controlling watchtower 50 transmits the further advertisement impression proof message at some later point after a predetermined delay time period has elapsed. In one embodiment, the controlling watchtower is reward in the form of an interest payment in response to sending the advertisement impression proof messages to the publisher and/or advertiser.

In response to receiving the advertisement impression proof message from the controlling watchtower 50, the processor 82 of the publisher device 80 is configured to forward at least the aggregated proof of attention $\sigma_{AggregatedAttention^*}$ the advertiser device 70 associated with the particular advertisement that was served. Forwarding the aggregated proof of attention $\sigma_{AggregatedAttention^*}$ acts as proof that payment is due to the publisher for the advertisement impression.

In an alternatively embodiment, in response to receiving the advertisement impression proof message from the controlling watchtower 50, the processor 82 of the publisher device 80 is configured to forward at least the aggregated proof of attention $\sigma_{AggregatedAttention^*}$ to some smart contract on the advertising blockchain $BC_{Ad}$. The smart contract contains logic for managing payment to the publisher from the advertiser in an automated manner. Alternatively, the smart contract obtains a signed release of funds to the publisher, from the advertiser, which is negotiated in an external communication channel.

In response to receiving the further advertisement impression proof message from the controlling watchtower 50 and receiving the aggregated proof of attention $\sigma_{AggregatedAttention^*}$ from the publisher device 80, the processor 72 of the advertiser device 70 verifies the $\sigma_{AggregatedAttention^*}$. Particularly, in order to verify the aggregated proof of attention $\sigma_{AggregatedAttention^*}$, the processor 72 calculates a hash $h_i \leftarrow H(M_i)$ of each proof of attention message m in the list of the messages $M_i$ (i.e., for $1 \le i \le k$). Next, the processor 72 checks if the following holds true:

$$e(\sigma_{AggregatedAttention}, g_2) = \prod_{i=1}^{k} e(h_i, v_i)$$

If so, then the aggregated proof of attention $\sigma_{AggregatedAttention^*}$ is validly constructed. If the aggregated proof of attention $\sigma_{AggregatedAttention^*}$ is valid, then the processor 72 initiates a payment process in which the publisher is paid for the advertisement impression. In at least one embodiment, the processor 72 operates the communication module 76 to transmit a message to initiate the payment process in which the publisher is paid for the advertisement impression. In one embodiment, the message is sent to a smart contract on the advertising blockchain $BC_{Ad}$ that has logic for managing the payment process. In one embodiment, the message is sent to some other electronic payment and/or banking system.

The amount that must be paid may be based upon some pre-negotiated value, a randomly selected value between the minimum the publisher was willing to accept and the maximum the advertiser was willing to pay. This random value may have some skew in either direction, if so desired. In some embodiments, since a truly random value should collapse to an expectation that is in the middle of the min and max price points, the advertiser pays the publisher the value that is the midpoint between the two prices. In some embodiments, a portion of this payment is provided to the designated set of watchtowers 50 that participated in providing the aggregated proof of attention $\sigma_{AggregatedAttention^*}$.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for auditing an advertisement impression in which a first advertisement was presented in conjunction with first media content, the method comprising:

transmitting, over a period of time with a transceiver of a first computing device, to each of a plurality of second computing devices under control of the first computing device, a plurality of randomly generated first cryptographic proofs, wherein each first cryptographic proof is used for producing a certificate for each second computing device for a portion of the period of time;

receiving, with the transceiver of the first computing device, a first message from a second computing device indicating that the first advertisement was presented in conjunction with first media content, the first message including (i) an identifier of the first advertisement, (ii) an first aggregated signature, the first aggregated signature being an aggregation of a set of proofs of interest, each proof of interest in the set of proofs of interest being signed under a respective content mapping key, associations between each of the respective content mapping keys and at least one media content classifier being stored on at least one blockchain; (iii) the respective content mapping keys under which the set of proofs of interest were signed, wherein each of the content mapping keys is provided by a respective third computing device associated with a provider of the first media content and (iv) respective data that was signed to generate each respective proof of interest in the set of proofs of interest; retrieving, with the transceiver, from the at least one blockchain, (i) the at least one media content classifier associated with each of the respective content mapping keys under which the set of proofs of interest were signed and (ii) a first targeting model for the first advertisement, the first targeting model being stored on the at least one blockchain in association with the identifier of the first advertisement and defining a target audience for the first advertisement;

evaluating, with a processor of the first computing device, the first targeting model for the first advertisement based on the at least one media content classifier associated with each of the respective content mapping keys under which the set of proofs of interest were signed, to determine whether a user to which the first advertisement was presented fits within the target audience for the first advertisement;

wherein the evaluating step comprises verifying, with the processor of the first computing device, that the first aggregated signature is a valid aggregation of the set of proofs of interest derived from (i) the respective content mapping keys under which the set of proofs of interest were signed and (ii) the respective data that was signed to generate each respective proof of interest in the set of proofs of interest;

wherein verifying the valid aggregation comprises determining if the respective data for each proof of interest comprises at least a concatenation of (i) the certificate derived from the latest first cryptographic proof of the respective second computing device, and (ii) the respective content mapping key under which the proof of interest was signed; and, transmitting, with the transceiver, only if the first aggregated signature was validly formed, and the user to which the first advertisement was presented fits within the target audience for the first advertisement, a second message indicating that the presentation of the first advertisement in conjunction with the first media content formed a valid advertisement impression, the second message being transmitted to one of (i) the respective third computing device associated with the provider of the first media content and (ii) the second computing device, the second message including a signature under a public key of the first computing device.

2. The method according to claim 1, wherein the first message further includes a first set of constraints defining allowable advertisements that can be presented in conjunction with the first media content, the method comprising:

retrieving, with the transceiver, from the at least one blockchain, a second set of constraints, the second set of constraints being stored on the at least one blockchain in association with the identifier of the first advertisement and defining allowable media content that the first advertisement can be presented in conjunction with;

determining, with the processor, whether the first advertisement satisfies the first set of constraints and whether the first media content satisfies the second set of constraints; and transmitting, with the transceiver, the second message to the third computing device only if the first advertisement satisfies the first set of constraints and the first media content satisfies the second set of constraints.

3. The method according to claim 2, wherein the first message further includes a signature of the first set of constraints under a public key of the third computing device associated with the provider of the first media content, the method comprising:

retrieving, with the transceiver, from the at least one blockchain, a signature of the second set of constraints under a public key of a fourth computing device associated with a provider of the first advertisement, the signature of the second set of constraints being stored on the at least one blockchain in association with the identifier of the first advertisement verifying, with the processor, whether the signature of the first set of constraints is valid based on (i) the public key of the third computing device and (ii) the first set of constraints;

verifying, with the processor, whether the signature of the second set of constraints is valid based on (i) the public key of the fourth computing device and (ii) the second set of constraints; and transmitting, with the transceiver, the second message to the third computing device only if the signature of the first set of constraints is valid and the signature of the second set of constraints is valid.

4. The method according to claim 1, the receiving the first message further comprising: receiving, with the transceiver, prior to receiving the first message, a plurality of messages from the second computing device indicating that a respective advertisement was presented in conjunction with respective media content, the plurality of messages being received within a threshold amount of time prior to receiving the first message; and transmitting, with the transceiver, the second message to the third computing device only if the plurality of messages received within the threshold amount of time prior to receiving the first message includes less than a threshold amount of messages.

5. The method according to claim 1 further comprising:
broadcasting, with the transceiver, prior to transmitting the second message to the third computing device, only if the user to which the first advertisement was presented fitting within the target audience for the first advertisement, a third message to a plurality of fifth computing devices, the third message including the first message that was received from the second computing device.

6. The method according to claim 5 further comprising:
receiving, with the transceiver, a plurality of fourth messages from the plurality of fifth computing devices, each message in the plurality of fourth messages being received from a respective computing device in the plurality of fifth computing devices and including a signature under a public key of the respective computing device in the plurality of fifth computing devices; and transmitting, with the transceiver, the second message only if the plurality of fourth messages include at least a threshold number of messages and are received within a threshold amount of time after broadcasting the third message.

7. The method according to claim 6 further comprising:
determining, with the processor, a second aggregated signature as an aggregation of the signature under the public key of the first computing device with the signatures under the public keys of the plurality of fifth computing devices; and transmitting, with the transceiver, the second message including the second aggregated signature as the signature under the public key of the first computing device.

8. The method according to claim 7, the determining the second aggregated signature further comprising:
determining the second aggregated signature as a product of the signature under a public key of the first computing device with all of the received signatures under the public keys of the plurality of fourth computing devices.

9. The method according to claim 1 further comprising, prior to receiving the first message from the second computing device:

receiving, with the transceiver, fifth message from the second computing device, the fifth message including a first public key;

generating, with the processor, the certificate for the first public key;

transmitting, with the transceiver, the certificate to the second computing device;

transmitting, with the transceiver, the certificate to at least one smart contract stored on the at least one blockchain, receipt of the certificate by the at least one smart contract stored causing publication of the certificate on the at least one blockchain to a list of certificates generated by the first computing device; and transmitting, with the transceiver, in response to the user to which the first advertisement was presented not fitting within the target audience for the first advertisement, a sixth message to the at least one smart contract stored on the at least one blockchain, receipt of the sixth message by the at least one smart contract causing revocation of a public key of the second computing device on the at least one blockchain.

10. The method according to claim 1 further comprising: transmitting, with the transceiver, in response to the user to which the first advertisement was presented not fitting within the target audience for the first advertisement, a sixth message to at least one smart contract stored on the at least one blockchain, receipt of the sixth message by the at least one smart contract causing revocation of a public key of the second computing device on the at least one blockchain.

11. The method according to claim 2 further comprising: transmitting, with the transceiver, in response to at least one of (i) the first advertisement not satisfying the first set of constraints and (ii) the first media content not satisfying the second set of constraints, a sixth message to at least one smart contract stored on the at least one blockchain, receipt of the sixth message by the at least one smart contract causing revocation of a public key of the second computing device on the at least one blockchain.

12. The method according to claim 3 further comprising: transmitting, with the transceiver, in response to at least one of (i) the signature of the first set of constraints being invalid and (ii) the signature of the second set of constraints being invalid, a sixth message to at least one smart contract stored on the at least one blockchain, receipt of the sixth message by the at least one smart contract causing revocation of a public key of the second computing device on the at least one blockchain.

13. The method according to claim 4 further comprising: transmitting, with the transceiver, in response to the plurality of messages received within the threshold amount of time prior to receiving the first message including at least the threshold amount of messages, a sixth message to at least one smart contract stored on the at least one blockchain, receipt of the sixth message by the at least one smart contract causing revocation of a public key of the second computing device on the at least one blockchain.

14. The method according to claim 1 further comprising transmitting, with the transceiver, only if the user to which the first advertisement was presented fitting within the target audience for the first advertisement, a seventh message to a fourth computing device associated with a provider of the first advertisement, the seventh message including the signature under the public key of the first computing device.

15. A method for running an advertising campaign, the method comprising:
generating, with a processor of a first computing device, a targeting model that defines a target audience for an advertisement of the advertising campaign;
transmitting, with a transceiver of the computing device, a first message to at least one smart contract that is stored on at least one blockchain, the first message including the targeting model and instructions for retrieving the advertisement, receipt of the first message by the at least one smart contract causing publication of the targeting model and the instructions for retrieving the advertisement on the at least one blockchain; and receiving, with the transceiver, a second message from a second computing device associated with a provider of media content, the second message indicating that the advertisement was presented in conjunction with media content to form a valid advertisement impression, the second message including a signature under a public key of a third computing device;

wherein the second message, indicating that the advertisement was presented in conjunction with the media content to form the valid advertisement impression, is only transmitted to the first computing device only if an aggregated signature is a valid aggregation of a set of proofs of interest derived from (i) respective content mapping keys under which the set of proofs of interest were signed and (ii) respective data that was signed to generate each respective proof of interest in the set of proofs of interest;

wherein verifying the valid aggregation comprises evaluating, with a processor of the third computing device, the targeting model for the advertisement based on at least one media content classifier associated with each of the respective content mapping keys under which the set of proofs of interest were signed, to determine whether a user to which the advertisement was presented fits within the target audience for the advertisement, wherein associations between each of the respective content mapping keys and the at least one media content classifier being stored on the at least one blockchain;

wherein verifying the valid aggregation further comprises determining, with the processor of the third computing device, if the respective data for each proof of interest comprises at least a concatenation of (i) a certificate derived from a latest cryptographic proof of a plurality of cryptographic proofs of the respective second computing device, and (ii) the respective content mapping key under which the proof of interest was signed;

wherein the latest cryptographic proof and the plurality of cryptographic proofs for each respective second computing device is transmitted, over a period of time, with the transceiver of the third computing device, to each of the second computing devices under control of the third computing device.

16. The method according to claim 15 further comprising:
generating, with the processor, a set of constraints defining allowable media content that the advertisement can be presented in conjunction with; and transmitting, with the transceiver, the first message to the at least one smart contract including the set of constraints, receipt of the first message by the at least one smart contract causing publication of the set of constraints on the at least one blockchain.

17. The method according to claim 16 further comprising:
generating, with the processor, a signature of the set of constraints under a public key of the first computing device; and
transmitting, with the transceiver, the first message to the at least one smart contract including the signature of the set of constraints, receipt of the first message by the at least one smart contract causing publication of the signature of the set of constraints on the at least one blockchain.

18. The method according to claim 15 further comprising:
receiving, with the transceiver, a third message from the third computing device, the third message including the signature under the public key of the third computing device.

19. The method according to claim 16 further comprising:
receiving, with a user interface of the first computing device, a plurality of user inputs; and
generating, with the processor, at least one of the targeting model and the set of constraints based on user inputs.

20. The method according to claim 1, the valid aggregation of the first aggregated signature is such that the concatenation further comprises a ring of valid second cryptographic proofs, wherein the ring of valid second cryptographic proofs includes (a) at least the latest first cryptographic proof of the respective second computing device associated with the first media content and under the control of the first computing device (b) at least one other valid first cryptographic proof not associated with the first media content and under the control of the first computing device;

wherein verifying the valid aggregation further comprises determining, with the processor of the first computing device, if the first aggregated signature comprises the ring of valid second cryptographic proofs under the control of the first computing device under which the first message was signed.

* * * * *